(12) United States Patent
Jung et al.

(10) Patent No.: US 10,028,169 B2
(45) Date of Patent: Jul. 17, 2018

(54) INTERFERENCE CANCELLATION METHOD IN WIRELESS COMMUNICATION SYSTEM, AND TERMINAL

(71) Applicant: LG ELECTRONICS INC., Seoul (KR)

(72) Inventors: Manyoung Jung, Seoul (KR); Yoonoh Yang, Seoul (KR); Sangwook Lee, Seoul (KR); Suhwan Lim, Seoul (KR); Changhwan Park, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 16 days.

(21) Appl. No.: 15/326,017

(22) PCT Filed: Aug. 6, 2015

(86) PCT No.: PCT/KR2015/008227
§ 371 (c)(1),
(2) Date: Jan. 12, 2017

(87) PCT Pub. No.: WO2016/021944
PCT Pub. Date: Feb. 11, 2016

(65) Prior Publication Data
US 2017/0208500 A1 Jul. 20, 2017

Related U.S. Application Data

(60) Provisional application No. 62/034,796, filed on Aug. 8, 2014.

(51) Int. Cl.
*H04W 24/02* (2009.01)
*H04W 28/04* (2009.01)
*H04L 5/00* (2006.01)

(52) U.S. Cl.
CPC .......... *H04W 28/04* (2013.01); *H04L 5/0048* (2013.01); *H04W 28/048* (2013.01)

(58) Field of Classification Search
CPC .... H04W 28/04; H04W 28/048; H04L 5/0048
See application file for complete search history.

(56) References Cited

U.S. PATENT DOCUMENTS 9,420,476 B2 * 8/2016 Koutsimanis .......... H04J 11/005
2013/0128940 A1 * 5/2013 Mergen .............. H04B 1/71072
375/227

(Continued)

OTHER PUBLICATIONS

MediaTek Inc., "Higher-layer signalling for NAICS and system impact analysis", 3GPP TSG-RAN WG1 #76bis, R1-141488, Mar. 22, 2014, 8 pages.

(Continued)

*Primary Examiner* — Phuc Tran
(74) *Attorney, Agent, or Firm* — Lee, Hong, Degerman, Kang & Waimey PC

(57) ABSTRACT

The present specification provides a method for receiving data through interference cancellation. The method can comprise the steps of: receiving a transmission signal transmitted by a DMRS-based transmission method; detecting, from the transmission signal, a DMRS-based transmission parameter for an interference cell having caused interference in the transmission signal; estimating an interference channel for the interference cell on the basis of the detected DMRS-based transmission parameter; generating an interference signal for the interference cell on the basis of the estimated interference channel; and cancelling the generated interference signal from the transmission signal so as to restore data transmitted by a serving cell.

11 Claims, 23 Drawing Sheets

(56) References Cited

U.S. PATENT DOCUMENTS

2014/0112250 A1\* 4/2014 Bahrenburg ......... H04B 1/7083
370/328
2015/0349855 A1\* 12/2015 Sesia ...................... H04B 7/024
370/252

OTHER PUBLICATIONS

Broadcom Corporation, "RRC signaling for NAICS", 3GPP TSG-RAN WG1 Meeting #76bis, R1-141508, Mar. 22, 2014, 5 pages.
Alcatel-Lucent et al., "Considerations on higher-layer signalling for NAICS", 3GPP TSG RAN WG1 Meeting #77, R1-142063, May 10, 2014, 5 pages.
LG Electronics, "Discussion on higher-layer signaling for NAICS", 3GPP TSG RAN WG1 Meeting #77, R1-142162, May 10, 2014, 7 pages.
Ericsson, "Higher Layer Signaling of TM10 DMRS Properties for NAICS", 3GPP TSG RAN WG1 Meeting #77, R1-142323, May 10, 2014, 5 pages.
3rd Generation Partnership Project, "Technical Specification Group Radio Access Network; Evolved Universal Terrestrial Radio Access (E-UTRA); Physical Channels and Modulation (Release 10)", 3GPP TS 36.211 V10.4.0, Dec. 2011, Chapter 4, pp. 9-11 (5 pages provided).
PCT International Application No. PCT/KR2015/008227, International Search Report dated Nov. 18, 2015, 2 pages.

\* cited by examiner

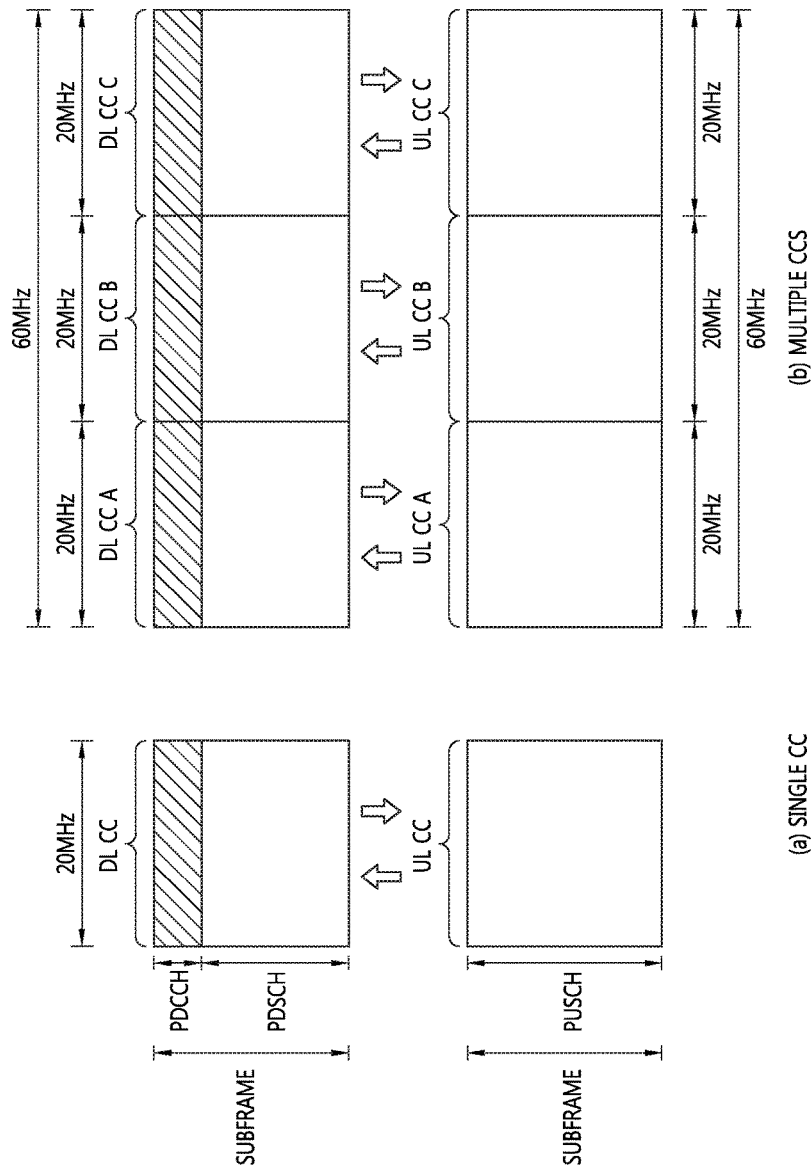

INTERFERENCE CANCELLATION METHOD IN WIRELESS COMMUNICATION SYSTEM, AND TERMINAL

CROSS-REFERENCE TO RELATED APPLICATIONS

This application is the National Stage filing under 35 U.S.C. 371 of International Application No. PCT/KR2015/008227, filed on Aug. 6, 2015, which claims the benefit of U.S. Provisional Application No. 62/034,796, filed on Aug. 8, 2014, the contents of which are all hereby incorporated by reference herein in their entirety.

BACKGROUND OF THE INVENTION

Field of the Invention

A disclosure of the present specification relates to an interference cancellation method and a terminal.

Related Art

A 3rd generation partnership project (3GPP) long term evolution (LTE) that improves a universal mobile telecommunications system (UMTS) has been introduced to a 3GPP release 8. The 3GPP LTE uses an orthogonal frequency division multiple access (OFDMA) in a downlink and a single carrier-frequency division multiple access (SC-FDMA) in an uplink. The OFDM needs to know in order to understand the OFDMA. The OFDM may be used since an inter-symbol interference effect can be reduced due to low complexity. The OFDM converts data to be input in serial into N parallel data and transmits it by carrying N orthogonal sub-carriers. The sub-carriers maintains orthogonally in a frequency dimension. Meanwhile, the OFDMA means a multiple access method to realize multiple accesses by providing a part of the available sub-carrier to each user independently, in a system using the OFDM in a modulation scheme.

In recent years, there is an ongoing discussion on 3GPP LTE-advanced (LTE-A) evolved from the 3GPP LTE.

In addition, as the congestion of a cell increases recently, the interference due to a neighboring cell further increases.

For example, recently, a discussion for a heterogeneous network in which a macro cell and a small-scale cell exist has been in progress. In particular, a discussion for detouring traffic has been progressed by distributing a terminal accessing in a macro cell to a small-scale cell.

Accordingly, the interference may be further increased owing to such a small scale cell, and therefore, an interference cancellation function is desperately needed.

SUMMARY OF THE INVENTION

An object of the present specification is to solve the above-mentioned problems.

Particularly, an object of a disclosure of the present specification is to provide a method and apparatus for receiving data by efficiently removing interference in a wireless communication system and a terminal.

In an aspect, there is provided a method for receiving data in a wireless communication system. The method may be performed by a user equipment and comprise: receiving a signal based on DeModulation Reference Signal (DMRS); detecting a DMRS-based transmission parameter for an interference cell that causes interference on the reception signal; estimating an interference channel for the interference cell based on the detected DMRS-based transmission parameter; generating an interference signal for the interference cell based on the estimated interference channel; and reconstructing data transmitted by a serving cell by removing the generated interference signal from the transmission signal.

Herein, the DMRS-based transmission parameter may include at least one of DMRS presence, a cell ID for the interference cell, a virtual cell ID, an antenna port, a scrambling identifier (nSCID) and Signal to Noise Ratio (SNR) for the interference signal.

In addition, detecting the DMRS-based transmission parameter may include: estimating each interference channel for each antenna port and scrambling identifier for the interference cell; comparing a reception power for each interference channel which is estimated with a predetermined threshold value; and detecting the antenna port and scrambling identifier that corresponds to the case that the reception power is greater than the threshold value as the antenna port and scrambling identifier for the interference cell.

In addition, the method may further include detecting a modulation order based on the interference channel which is estimated, where the interference signal may be generated based on the estimated interference channel and the modulation order.

In addition, the interference cell may be plural, each of a plurality of interference signals may be sequentially generated from the interference signal of which signal strength is the greatest, and a removal of the interference signal from the transmission signal may be performed by sequentially removing the interference signal from the interference signal of which signal strength is the greatest.

In addition, the method may further include performing a Cell specific Reference Signal Interference Cancellation (CRS-IC) for removing interference for a Cell specific Reference Signal (CRS) first, before detecting the DMRS-based transmission parameter.

In another aspect, a user equipment according to a disclosure of the present specification is a UE for receiving data in a wireless communication system may include a radio frequency (RF) unit configured to receive a transmission signal transmitted by a transmission scheme based on a DeModulation Reference Signal (DMRS); and a processor configured to perform: detecting a DMRS-based transmission parameter for an interference cell that causes interference on the transmission signal from the transmission signal, estimating an interference channel for the interference cell based on the detected DMRS-based transmission parameter, generating an interference signal for the interference cell based on the estimated interference channel, and reconstructing data transmitted by a serving cell by removing the generated interference signal from the transmission signal.

Advantageous Effects

According to a disclosure of the present specification, an interference channel is estimated by a Blind Detection of a DMRS-based transmission parameter, and an interference signal is generated through it and removed from a reception signal, thereby having an advantage of increasing a data demodulation performance.

BRIEF DESCRIPTION OF THE DRAWINGS

FIG. 8 is a view illustrating an example of comparison between an existing single carrier system and a carrier aggregation system.

DESCRIPTION OF EXEMPLARY EMBODIMENTS

Figure 1:
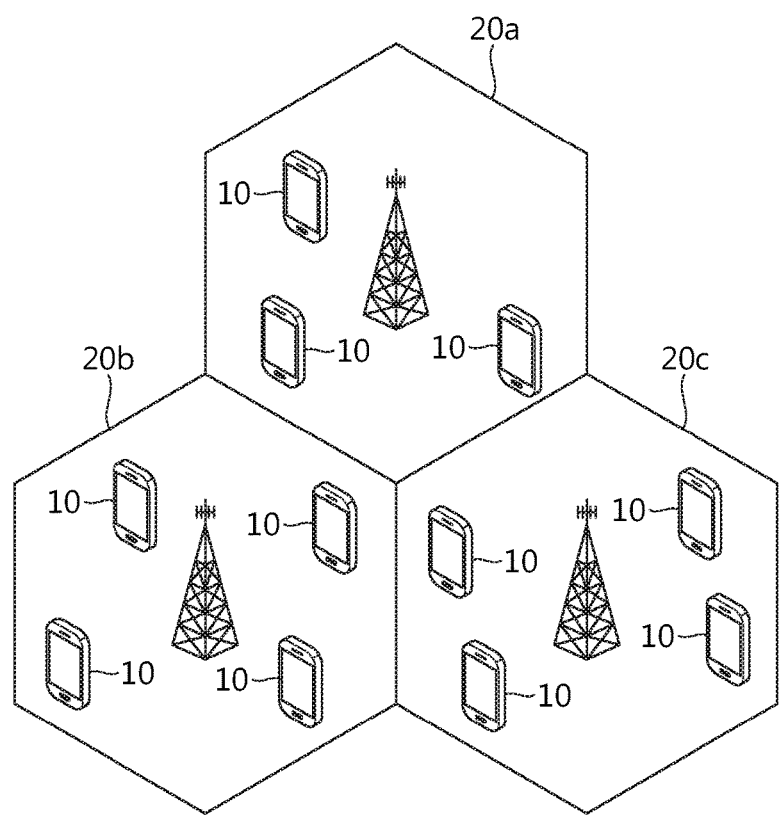
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

FIG. 1 shows a wireless communication system.

The wireless communication system 10 includes at least one base station (BS) 20. Respective BSs 20 provide a communication service to particular geographical areas 20a, 20b, and 20c (which are generally called cells). Each cell may be divided into a plurality of areas (which are called sectors). A user equipment (UE) 10 may be fixed or mobile and may be referred to by other names such as mobile station (MS), mobile user equipment (MT), user equipment (UT), subscriber station (SS), wireless device, personal digital assistant (PDA), wireless modem, handheld device. The BS 201 generally refers to a fixed station that communicates with the UE 10 and may be called by other names such as evolved-NodeB (eNB), base transceiver system (BTS), access point (AP), etc.

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Figure 2:
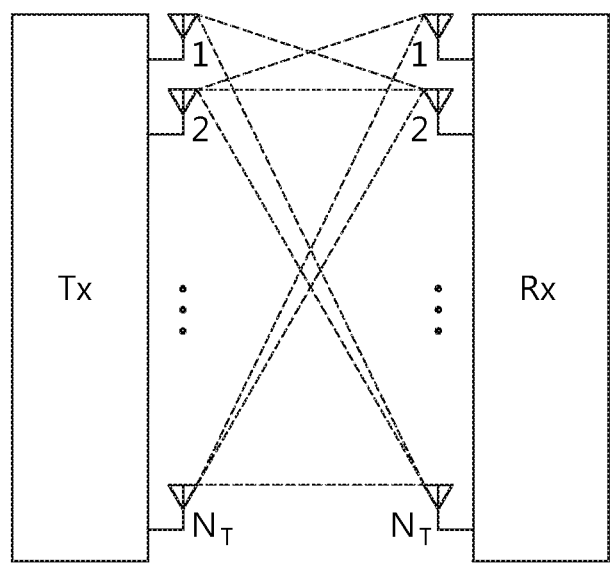
FIG. 2 is a view illustrating an antenna configuration of a multi-antenna system.

FIG. 2 illustrates a general multiple antenna system.

As shown in FIG. 2, when increasing the number of transmission antenna to $N_T$ and increasing the number of reception antenna to $N_R$ at the same time, a transmission rate can be increased and a frequency efficiency can be dramatically increased because a theoretical channel transmission capacity is increased in proportion to the number of antenna, unlike the case of using multiple antennas only in either one of transmitter or receiver.

The transmission rate due to the increase of channel transmission capacity may be theoretically increased by multiple of a maximum transmission rate $R_o$ in case of using an antenna and a rate increase $R_i$ as shown below.

$$R_i = \min(N_T, N_R) \quad \text{[Equation 1]}$$

Transmission information may include a maximum of NT number of different information items when the number of transmit antennas is NT.

$$s = [s_1, s_2, \ldots, s_{N_T}]^T \quad \text{[Equation 2]}$$

In Equation 2, s denotes transmission information vector, and s1, s2, ..., sNT denotes information items as elements of the transmission information vector. Each of the information items may be transmitted with different transmission power. When each transmission power is denoted as (P1, P2, ..., PNT), the transmission information vector to which transmission power is applied may be expressed as Equation 3 below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Equation 3 may be expressed as the product of a transmission power diagonal matrix and the transmission information vector.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

A weight matrix is multiplied to the transmission information vector with transmission power applied thereto to generate transmission signals (x1, x2, ..., xNT) transmitted through the actual NT number of transmission antennas. The weight matrix W serves to appropriately distribute transmission information to individual antennas according to a transmission channel situation. When a transmission signal vector is x, x may be expressed as Equation 5 below.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In Equation 5, an element wij ($1 \le i \le NT$, $1 \le j \le NT$) of the weight matrix denotes a weight value for ith transmission antenna and jth transmission information. The weight matrix W is also called a precoding matrix.

The transmission signal vector may include different transmission information according to a transmission technique. For example, when space diversity, i.e., transmission diversity, is applied, all of transmission information of transmission signal vectors may be the same. That is, [s1, s2, ..., snT] may be the same information, for example, [s1, s1, ..., s1]. Thus, since the same transmission information is transmitted to a received through different channels, a diversity effect is obtained and reliability of transmission increases.

Or, when space multiplexing is applied, all of transmission information of transmission signal vectors may be different. That is, s1, s2, ..., snT may be different information. Since different transmission information is transmitted to a receiver through different channels, an amount of transmittable information may increase.

Also, transmission information may be transmitted using both space diversity and space multiplexing. That is, in the foregoing example, the same information may be transmitted through three transmission antennas by space diversity, while different information may be transmitted through the other remaining transmission antennas by space multiplexing. In this case, the transmission information vector may be configured as [s1, s1, s1, s2, s3 ..., snT-2], for example.

When a receiver has NR number of reception antennas, signals received by the individual reception antennas may be expressed as yn(1≤n≤NR). Here, the reception signal vector y may be expressed as Equation 6 below.

$$y = [y_1, y_2, \ldots, y_{N_R}]^T \quad \text{[Equation 6]}$$

When channel remodeling is performed in a MIMO system, channels may be discriminated by an index of a transmission antenna and an index of a reception antenna. When the index of the transmission antenna is j and the index of the reception antenna is I, a channel between the transmission antenna and the reception antenna may be expressed as hij (An attention should be paid to the fact that the index of the reception antenna is first expressed and the index of the transmission antenna is expressed later in the subscript expressing the channel).

Figure 3:
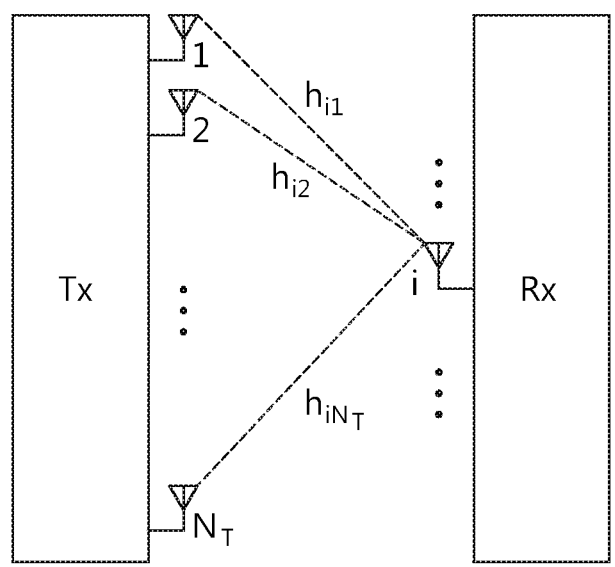
FIG. 3 is a view illustrating an example of a channel in the multi-antenna system.

FIG. 3 is a view illustrating a channel in a multi-antenna system.

Referring to FIG. 3, channels with respect to NT number of transmission antennas and a reception antenna I are expressed as hi1, hi2, . . . , hiNT, respectively. For the sake of convenience, these channels may be expressed as a matrix or a vector. The channels may be expressed in the form of vector in Equation 7 below.

$$h_i^T = [h_{i1}, h_{i2}, \ldots, h_{iN_T}] \quad \text{[Equation 7]}$$

When a matrix form of all the channels from NT number of transmission antennas to NR number of reception antennas is a channel matrix H, the channel matrix H may be expressed as Equation 8 below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Signals transmitted through the transmission antennas may be received by the reception antennas through the channels expressed in Equation 8. Here, noise is added in the actual channels. Such noise may be considered as additive white Gaussion noise (AWGN) mathematically. When AWGN added to the reception antennas is expressed as n1, n2, . . . , nNR, the AWGN may be expressed as a vector of Equation 9 below for the sake of convenience.

$$n = [n_1, n_2, \ldots, n_{N_R}]^T \quad \text{[Equation 9]}$$

In consideration of the foregoing AWGN, the transmission signal vector x, and the channel matrix, a reception signal vector y received by the reception antennas may be expressed as Equation 10 below.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

In the channel matrix H, the number of rows and the number of columns are determined depending on the number of transmission antennas and the number of reception antennas. In the channel matrix H, the number of columns is equal to the number of transmission antennas. Thus, the channel matrix H may be expressed as a NR x NT matrix.

In general, a rank of a matrix is defined by a smaller one among the number of independent rows and the number of independent columns. Thus, the rank of the matrix cannot be greater than the number of columns or the number of rows, and the rank of the channel matrix H may be determined as Equation 11 below.

$$\text{rank}(H) \leq \min(N_T, N_R) \quad \text{[Equation 11]}$$

Meanwhile, a wireless communication system may be divided into a frequency division duplex (FDD) method and a time division duplex (TDD) method. Based on the FDD method, an uplink transmission and a downlink transmission are progressed in different frequency bands. Based on the TDD method, the uplink transmission and the downlink transmission are performed in the same frequency band at different times. A channel response of a TDD method is actually reciprocal. This means the downlink channel response and the uplink channel response are almost same in the current frequency domain. Therefore, there is an advantage in that the downlink channel response in the wireless communication system based on the TDD may be obtained from the uplink channel response. In the TDD method, as the whole frequency domain is divided into an uplink transmission and a downlink transmission by time-share, it is not available to perform the downlink transmission by a terminal and the uplink transmission by a UE at the same time. In the TDD system in which an uplink transmission and a downlink transmission are divided by a subframe unit, the uplink transmission and the downlink transmission are performed in different subframes.

Hereinafter, the LTE system is described in further detail.

Figure 4:
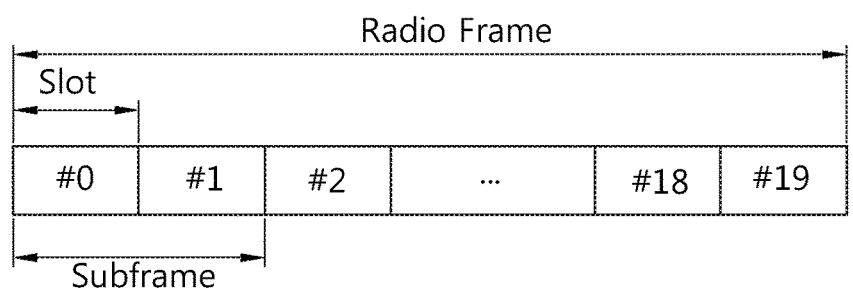
FIG. 4 is a view illustrating a structure of a radio frame according to FDD in a 3GPP LTE.

FIG. 4 illustrates the architecture of a radio frame according to FDD in 3GPP LTE.

Referring to FIG. 4, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Figure 5:
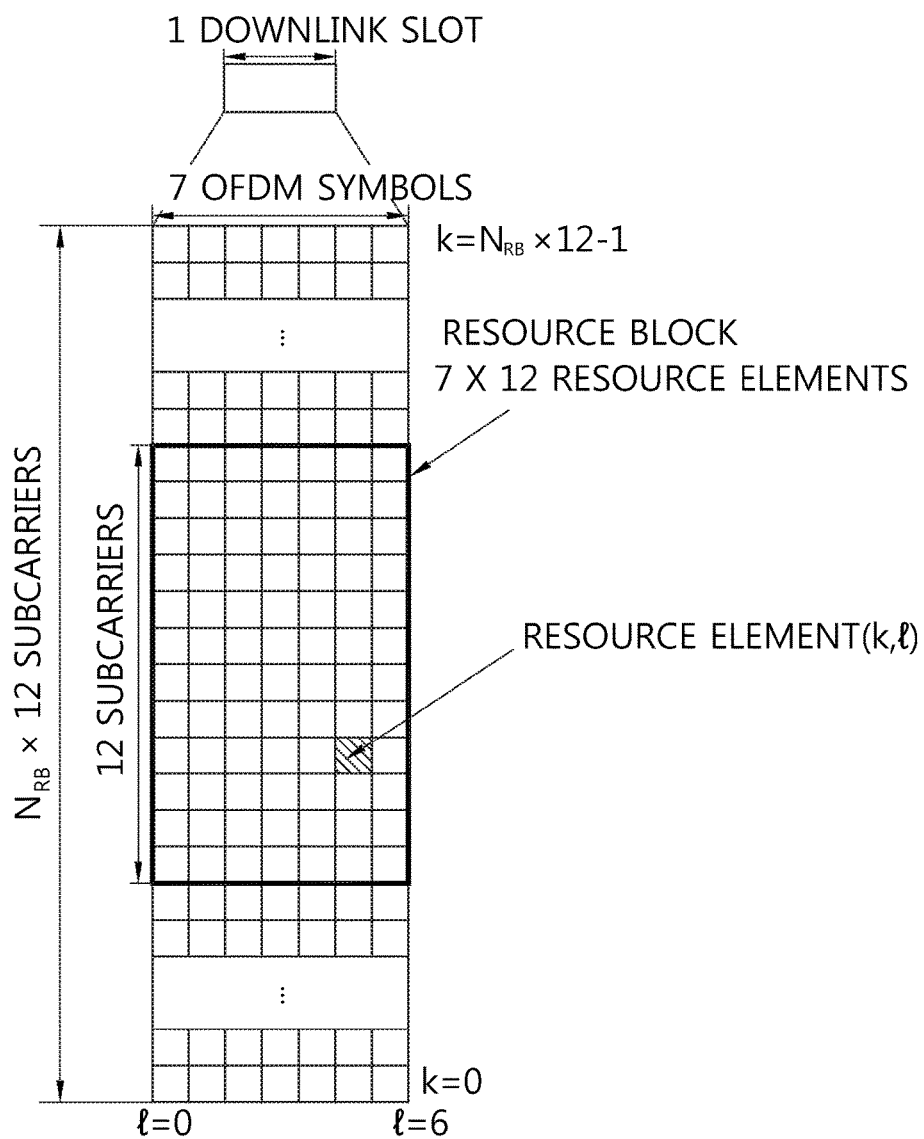
FIG. 5 is a view illustrating a resource grid regarding a single uplink or downlink slot in the 3GPP LTE.

FIG. 5 illustrates an example resource grid for one uplink or downlink slot in 3GPP LTE.

Referring to FIG. 5, the uplink slot includes a plurality of OFDM (orthogonal frequency division multiplexing) symbols in the time domain and NUL resource blocks (RBs) in the frequency domain. OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

In 3GPP LTE, the resource grid for one uplink slot shown in FIG. 4 may also apply to the resource grid for the downlink slot.

Figure 6:
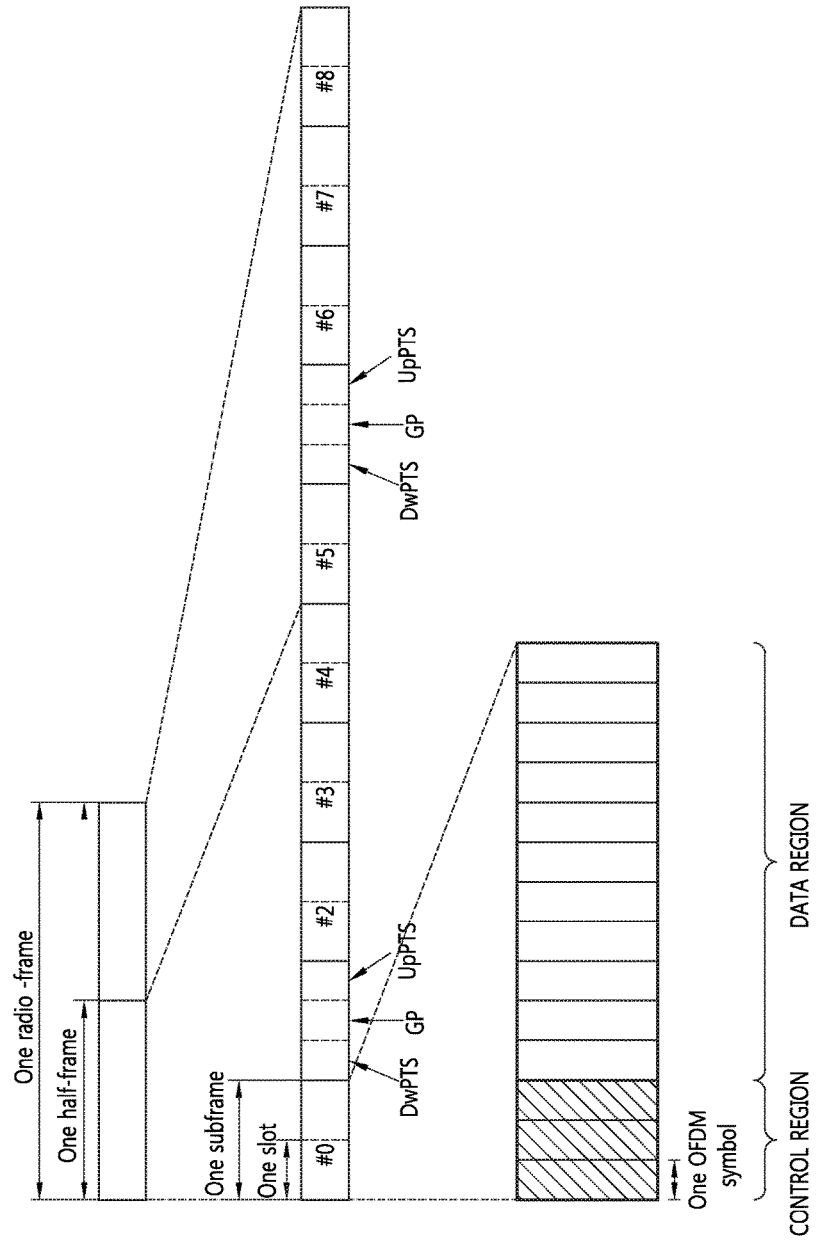
FIG. 6 is a view illustrating a structure of a downlink subframe.

FIG. 6 illustrates the architecture of a downlink sub-frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

Here, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 7:
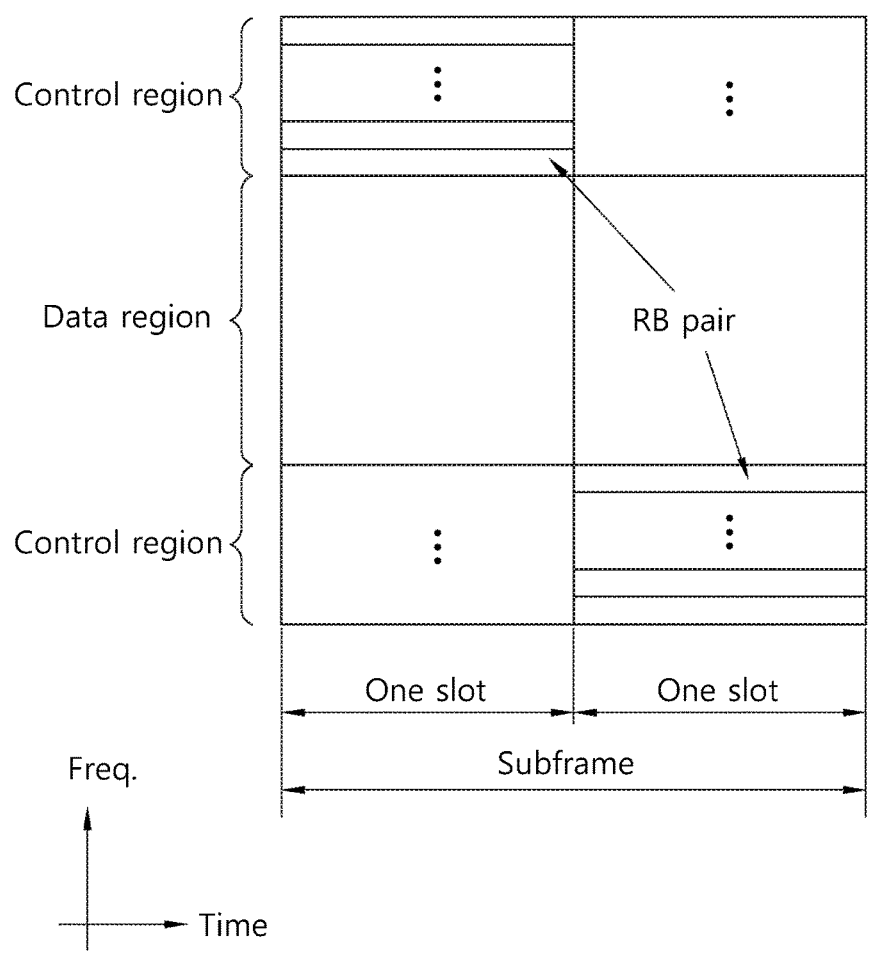
FIG. 7 is a view illustrating a structure of an uplink subframe in the 3GPP LTE.

FIG. 7 illustrates the architecture of an uplink sub-frame in 3GPP LTE.

Referring to FIG. 7, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary. The terminal may obtain a frequency diversity gain by transmitting uplink control information through different sub-carriers over time.

FIG. 8 illustrates an example of comparison between a single carrier system and a carrier aggregation system.

Referring to (a) portion of FIG. 8, a typical FDD wireless communication system supports one carrier for uplink and downlink. In this case, the carrier may have various bandwidths, but only one carrier is assigned to the user equipment.

In other words, in the typical FDD wireless communication system, data transmission and reception is carried out through one downlink band and one uplink band corresponding thereto. The bit stream and the user equipment transmit and receive control information and/or data scheduled for each sub-frame. The data is transmitted/received through the data region configured in the uplink/downlink sub-frame, and the control information is transmitted/received through the control region configured in the uplink/downlink sub-frame. For this, the uplink/downlink sub-frame carries signals through various physical channels. Although the description in connection with FIG. 5 primarily focuses on the FDD scheme for ease of description, the foregoing may be applicable to the TDD scheme by separating the radio frame for uplink/downlink in the time domain.

As shown in (a) of FIG. 8, data transmission/reception performed through one downlink band and one uplink band corresponding to the downlink band is referred to as a single carrier system.

Such single carrier system may correspond to an example of communication in the LTE system. Such 3GPP LTE system may have an uplink bandwidth and a downlink bandwidth that differ from each other, but supports up to 20 MHz.

Meanwhile, a high data transmission rate is demanded. The most fundamental and stable solution to this is to increase bandwidth.

However, the frequency resources are presently saturated, and various technologies are partially being in use in a wide range of frequency band. For such reason, as a method for securing a broad bandwidth to satisfy the demand for higher data transmission rate, each scattered band may be designed to meet basic requirements for being able to operate an independent system, and carrier aggregation (CA) whose concept is to bundle up multiple bands to a single system has been introduced.

That is, the carrier aggregation (CA) system means a system that constitutes a broadband by gathering one or more carriers each of which has a bandwidth narrower than the targeted broadband when supporting a broadband in the wireless communication system.

Such carrier aggregation (CA) technology is also adopted in the LTE-advanced (hereinafter, 'LTE-A'). The carrier aggregation (CA) system may also be referred to as a multiple-carrier system or bandwidth aggregation system.

In the carrier aggregation (CA) system, a user equipment may simultaneously transmit or receive one or more carriers depending on its capabilities. That is, in the carrier aggregation (CA) system, a plurality of component carriers (CCs) may be assigned to a user equipment. As used herein, the term "component carrier" refers to a carrier used in a carrier aggregation system and may be abbreviated to a carrier. Further, the term "component carrier" may mean a frequency block for carrier aggregation or a center frequency of a frequency block in the context and they may be interchangeably used.

(b) portion of FIG. 8 may correspond to a communication example in an LTE-A system.

Referring to (b) portion of FIG. 8, in case, e.g., three 20 MHz component carriers are assigned to each of uplink and downlink, the user equipment may be supported with a 60 MHz bandwidth. Or, for example, if five CCs are assigned as granularity of the unit of carrier having a 20 MHz bandwidth, up to 100 MHz may be supported. (b) of FIG. 8 illustrates an example in which the bandwidth of an uplink component carrier is the same as the bandwidth of a downlink component carrier for ease of description. However, the bandwidth of each component carrier may be determined independently. When aggregating one or more component carriers, a targeted component carrier may utilize the bandwidth used in the existing system for backward compatibility with the existing system. For example, in a 3GPP LTE system, bandwidths of 1.4 MHz, 3 MHz, 5 MHz, 10 MHz, 15 MHz and 20 MHz may be supported. Accordingly, the bandwidth of an uplink component carrier may be constituted like 5 MHz(UL CC0)+20 MHz(UL CC1)+20 MHz(UL CC2)+20 MHz(UL CC3)+5 MHz(UL CC4), for example. However, without consideration of backward compatibility, a new bandwidth may be defined rather the existing system bandwidth being used, to constitute a broadband.

(b) portion of FIG. 8 illustrates an example in which the number of uplink component carriers is symmetric with the number of downlink component carriers for ease of description. As such, when the number of uplink component carriers is the same as the number of downlink component carriers is denoted symmetric aggregation, and when the number of uplink component carriers is different from the number of downlink component carriers is denoted asymmetric aggregation.

The asymmetric carrier aggregation may occur due to a restriction on available frequency bands or may be artificially created by a network configuration. As an example, even when the entire system band comprises N CCs, the frequency band where a particular user equipment may perform reception may be limited to M (<N) CCs. Various parameters for carrier aggregation may be configured cell-specifically, UE group-specifically, or UE-specifically.

Meanwhile, carrier aggregation systems may be classified into contiguous carrier aggregation systems where each carrier is contiguous with another and non-contiguous carrier aggregation systems where each carrier is spaced apart from another. A guard band may be present between the carriers in the contiguous carrier aggregation system. Hereinafter, simply referring to a multi-carrier system or carrier aggregation system should be understood as including both when component carriers are contiguous and when component carriers are non-contiguous.

Meanwhile, the concept of cell as conventionally appreciated is varied by the carrier aggregation technology. In other words, according to the carrier aggregation technology, the term "cell" may mean a pair of a downlink frequency resource and an uplink frequency resource. Or, the cell may mean a combination of one downlink frequency resource and an optional uplink frequency resource.

In other words, according to the carrier aggregation technology, one DL CC or a pair of UL CC and DL CC may correspond to one cell. Or, one cell basically includes one DL CC and optionally includes a UL CC. Accordingly, a user equipment communicating with a bit stream through a plurality of DL CCs may be said to receive services from a plurality of serving cells. In this case, although downlink is constituted of a plurality of DL CCs, uplink may be used by only one CC. In such case, the user equipment may be said to receive services from a plurality of serving cells for downlink and to receive a service from only one serving cell for uplink.

Meanwhile, in order for packet data to be transmitted/ received through a cell, configuration for a particular cell should be completed. Here, the term "configuration" means the state where system information necessary for data transmission/reception on a corresponding cell is completely received. For example, the configuration may include the overall process of receiving common physical layer parameters necessary for data transmission/reception, MAC (media access control) layer parameters, or parameters necessary for a particular operation in RRC layer. The configuration-completed cell is in the state where packet transmission/reception is possible simply when information indicating that packet data may be transmitted is received.

The configuration-completed cell may be left in activation or deactivation state. Here, the term "activation" refers to data transmission or reception being performed or being ready. The UE may monitor or receive a control channel (PDCCH) or data channel (PDSCH) of an activated cell in order to identify resources (which may be frequency or time) assigned thereto.

Transmission or reception with a deactivated cell is impossible, while measurement or transmission/reception of least information is possible. The user equipment may receive system information (SI) necessary for receiving packets from a deactivated cell. In contrast, the user equipment does not monitor or receive the control channel (PDCCH) and data channel (PDSCH) of deactivated cells to identify resources (which may be frequency or time) assigned thereto.

In accordance with carrier aggregation technology, thus, activation/deactivation of a component carrier may be the same in concept as activation/deactivation of a serving cell. For example, assuming that serving cell 1 comprises DL CC1, activation of serving cell 1 means activation of DL CC1. Assuming that serving cell 2 is configured so that DL CC2 is connected with UL CC2, activation of serving cell 2 means activation of DL CC2 and UL CC2. In that regard, each component carrier may correspond to a serving cell.

On the other hand, a change in the concept of serving cell as conventionally understood by the carrier aggregation technology leads to primary cells and secondary cells being separated from each other.

The primary cell refers to a cell operating in a primary frequency and means a cell where the user equipment performs an initial connection establishment procedure or connection re-establishment procedure with a bit stream or a cell designated so during the course of handover.

The secondary cell means a cell operating in a secondary frequency, and is configured once an RRC connection is established and is used to provide additional radio resources.

The PCC (primary component carrier) means a component carrier (CC) corresponding to the primary cell. The PCC means a CC where the user equipment initially achieves connection (or RRC connection) with the base station among various CCs. The PCC is a special CC that is in charge of connection (or RRC connection) for signaling regarding multiple CCs and that manages UE context that is connection information relating to the UE. Further, the PCC, in case the PCC achieves connection with the UE so that it is in RRC connected mode, always remains in activated state. The downlink component carrier corresponding to the primary cell is referred to as a downlink primary component carrier (DL PCC), and the uplink component carrier corresponding to the primary cell is referred to as an uplink primary component carrier (UL PCC).

The SCC (secondary component carrier) means a CC corresponding to the secondary cell. That is, the SCC is a CC assigned to the user equipment, which is not the PCC, and the SCC is an extended carrier for the user equipment to assign additional resources other than the PCC. The SCC may stay in activated state or deactivated state. The downlink component carrier corresponding to the secondary cell is referred to as a downlink secondary component carrier (DL SCC), and the uplink component carrier corresponding to the secondary cell is referred to as an uplink secondary component carrier (UL SCC).

The primary cell and the secondary cell have the following features.

First, the primary cell is used for transmission of a PUCCH. Second, the primary cell always remain activated while the secondary cell switches between activation/deactivation depending on particular conditions. Third, when the primary cell experiences radio link failure (hereinafter, "RLF"), the RRC reconnection is triggered. Fourth, the primary cell may be varied by a handover procedure that comes together with security key changing or an RACH (Random Access CHannel) procedure. Fifth, NAS (non-access stratum) information is received through the primary cell. Sixth, in the case of an FDD system, the primary cell is constituted of a pair of DL PCC and UL PCC. Seventh, a different component carrier may be set as the primary cell for each user equipment. Eighth, primary cells may be exchanged only by a handover, cell selection/cell reselection process. In adding a new secondary cell, RRC signaling may be used to transmit system information of the dedicated secondary cell.

As described above, the carrier aggregation system may support a plurality of component carriers (CCs), i.e., a plurality of serving cells, unlike the single carrier system.

Such carrier aggregation system may support cross-carrier scheduling. The cross-carrier scheduling is a scheduling method that allows for resource allocation of a PDSCH transmitted through other component carrier through a PDCCH transmitted through a particular component carrier and/or resource allocation of a PUSCH transmitted through other component carrier than the component carrier basically linked with the particular component carrier. That is, a PDCCH and a PDSCH may be transmitted through different downlink CCs, and a PUSCH may be transmitted through an uplink CC other than an uplink CC linked with a downlink CC through which a PDCCH including a UL grant is transmitted. As such, the cross-carrier scheduling-supportive system requires a carrier indicator indicating a DL CC/UL CC through which a PDSCH/PUSCH through which a PDCCH provides control information is transmitted. The field containing such carrier indicator is hereinafter referred to as a carrier indication field (CIF).

The carrier aggregation system supportive of cross-carrier scheduling may include a carrier indication field (CIF) in the conventional DCI (downlink control information) format. A cross-carrier scheduling-supportive system, e.g., an LTE-A system, adds a CIF to the existing DCI format (i.e., DCI format used in LTE), so that it may be extended with three bits, and it may reuse the existing coding scheme, resource allocation scheme (i.e., CCE-based resource mapping) for the PDCCH structure.

Hereinafter, a reference signal will be described.

In general, transmission information, for example, data, is easily distorted or changed while being transmitted through a wireless channel. Thus, in order to demodulate such transmission information without an error, a reference signal is required. The reference signal, a signal known in advance between a transmitter and a receiver, is transmitted together with the transmission information. The transmission information transmitted from the transmitter undergoes a channel corresponding to each transmission antennas or each layer, and thus, the reference signal may be allocated for each transmission antenna or each layer. The reference signal for each transmission antenna or each layer may be discriminated by using resource such as a time, a frequency, or a code. The reference signal may be used for two purposes, that is, demodulation of transmission information and channel estimation.

Reference signals may be divided into two types of reference signals depending on a range of a receiver which already knows about the reference signals. A first type of reference signal is a reference signal that only a specific receiver (for example, a specific terminal) knows, and such a reference signal is called a dedicated reference signal (DRS). In this context, the DRS is also called a UE-specific R. A second type of reference signal is a reference signal that every receiver, for example, every UE, knows, and such a reference signal is called a common reference signal (CRS). The CRS is also called a cell-specific RS.

Reference signals may also be classified according to purposes. For example, a reference signal used for demodulating data is called a demodulation reference signal (DM-RS). A reference signal used for feedback information indicating a channel state such as CQI/PMI/RI is called a channel state indicator-reference signal (CSI-RS). The foregoing DRS may be used as a DM-RS. Hereinafter, it is assumed that the DM-RS is a DRS.

Figure 9A:
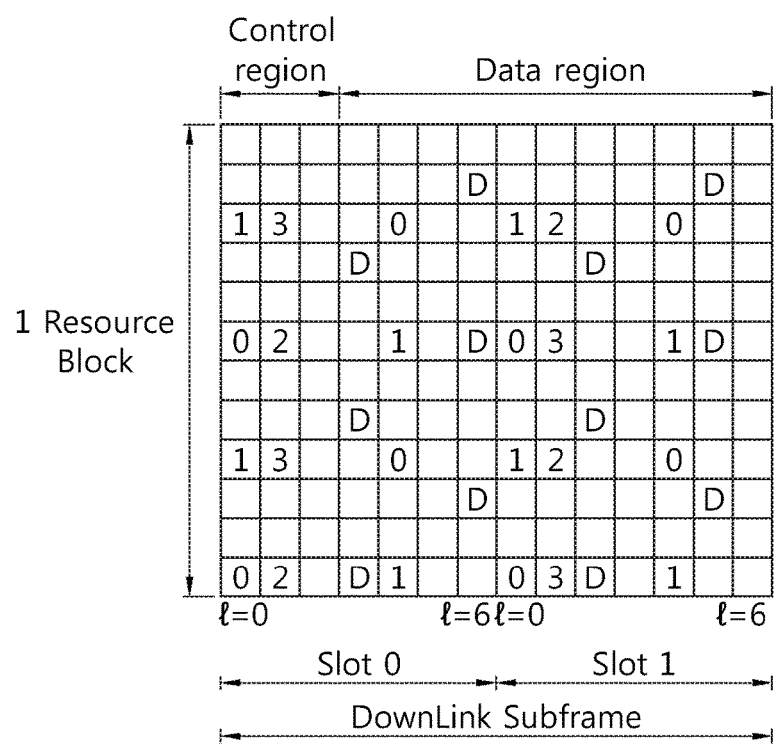
FIG. 9a is a view illustrating an example of an RS structure capable of supporting four antenna ports in a normal CP.
Figure 9B:
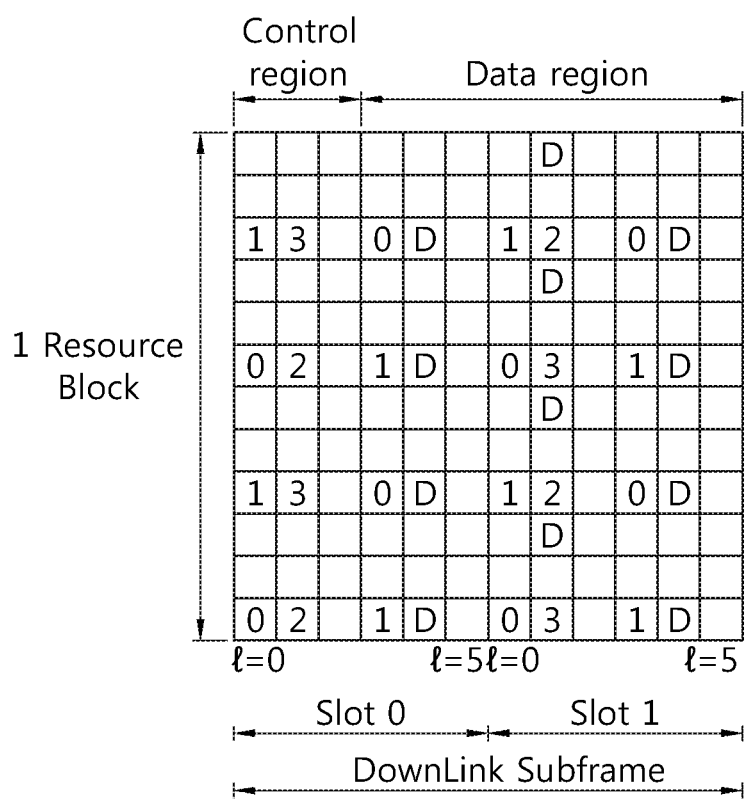
FIG. 9b is a view illustrating an example of an RS structure capable of supporting four antenna ports in an extended CP.

FIG. 9a is a view illustrating an example of an RS structure capable of supporting four antenna ports in a normal CP. FIG. 9b is a view illustrating an example of an RS structure capable of supporting four antenna ports in an extended CP.

The RS structures of FIGS. 9a and 9b are those used in the related art 3GPP LTE system.

In FIGS. 9a and 9b, resource elements in which any one of numbers from 0 to 3 are expressed indicate resource elements in which a cell-specific reference signal, i.e., a CRS, is transmitted. Here, any one of the numbers from 0 to 3 indicate a supported antenna port. That is, resource elements indicated by p (p is any one of 0 to 3) refer to resource elements to which a CRS with respect to an antenna port p is mapped. Such a CRS is used to perform channel measurement and data demodulation with respect to each antenna port. The CRS is transmitted in both a control region and a data region of a subframe.

In FIGS. 9a and 9b, resource elements indicated by 'D' denote resource elements to which a UE-specific reference signal, i.e., a DRS, is mapped. The UE-specific RS may be used for transmission of a single antenna port of a PDSCH. A UE is instructed as to whether a UE-specific RS is transmitted through a higher layer signal, or as to whether a UE-specific RS is valid when a PDSCH is transmitted. The UE-specific RS may be transmitted only when data demodulation is required. The UE-specific RS may be transmitted only in a data region of a subframe.

Figure 10:
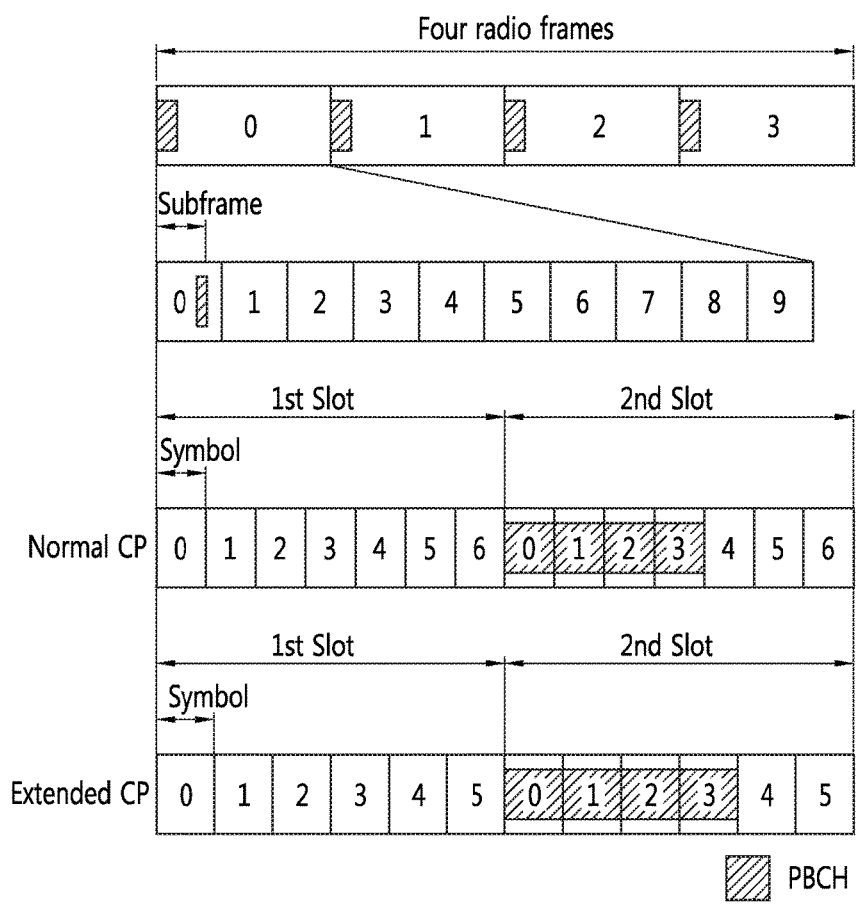
FIG. 10 illustrates a frame structure for a Physical Broadcast Channel (PBCH).

FIG. 10 illustrates a frame structure for a Physical Broadcast Channel (PBCH).

As shown in FIG. 10, a radio frame, a subframe and a symbol number start from 0. A PBCH is transmitted on every radio frame, that is, 10 ms.

In addition, as shown in FIG. 10, the PBCH is transmitted on $0^{th}$ subframe of each radio frame. In more particular, the PBCH is transmitted on $0^{st}$, $1^{st}$, $2^{nd}$ and $3^{rd}$ symbols of the second slot.

The PBCH is used for each BS to transmit the most important Master Information Block (MIB) data for an operation of a system, and such MIB information is retransmitted in very low coding rate in 10 ms period by four times such that all UEs accessing to the corresponding cell is able to receive it, which enables a reception of the MIB information even in very poor channel environment.

Meanwhile, the MIB information of total 24 bits is defined in TS36.331 of the current LTE standard as follows.

TABLE 1

```
-- ASN1START
MasterInformationBlock ::=        SEQUENCE {
    dl-Bandwidth                     ENUMERATED {
                                         n6, n15, n25, n50,
n75, n100},
    phich-Config                     PHICH-Config,
    systemFrameNumber                BIT STRING (SIZE (8)),
    spare                            BIT STRING (SIZE (10))
}
-- ASN1STOP
```

Generally, the same data of the MIB information predetermined for each cell is transmitted on every transmission except systemFrameNumber field, and notified to all UEs in a cell through a separate paging RRC signaling in the case that a modification of the System Information Block (SIB) that includes the MIB is required for other reasons. Accordingly, commonly, the PBCH reception of a UE is required only once when the initial cell detection is performed. And later, the existing information is maintained until the Radio Resource Control (RRC) signaling about an update of the PBCH information of a serving cell is incoming, and additional reception procedure is not required.

On the other hand, recently, a discussion for a heterogeneous network in which a macro cell and a small-scale cell exist has been in progress. In particular, a discussion for detouring traffic has been progressed by distributing a UE accessing in a macro cell to a small-scale cell.

Figure 11:
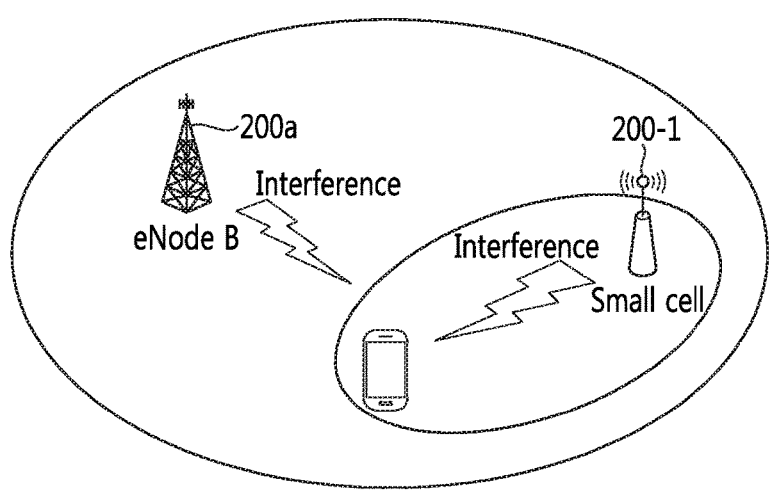
FIG. 11 illustrates a heterogeneous network including a macro cell and a small-scale cell.

FIG. 11 illustrates a heterogeneous network including a macro cell and a small-scale cell.

A heterogeneous network in which a small-scale cell (e.g., a pico cell, a femto cell, or a micro cell) having lower-power transmit power exists in the existing marco cell coverage in an overlapping manner is under discussion in a next-generation communication standard including 3GPP LTE-A.

Referring to FIG. 11, the macro cell may overlap with one or more micro cells. A service of the macro cell is provided by a macro eNodeB (MeNB). In the present specification, the macro cell and the MeNB may be used together. A UE having access to the macro cell may be referred to as a macro UE. The marco UE receives a downlink signal from the MeNB, and transmits an uplink signal to the MeNB.

The aforementioned small-scale cell is also referred to as a femto cell, a pico cell, or a macro cell. A service of the small-scale cell is provided by a pico eNodeB, a home eNodeB (HeNB), a relay node (RN), etc. For the convenience, the pico eNodeB, the HeNB, and the RN are collectively referred to as the HeNB. In the present specification, the macro cell and the HeNB may be used together.

The heterogeneous network has an inter-cell interference problem since the macro cell and the small-scale cell overlap. As illustrated, in the case that the UE is located in a boundary of the macro cell and the small-scale cell, a downlink signal from the macro cell may act as interference. Similarly, a downlink signal of the small-scale cell may also act as interference.

For a more specific example, when the UE 100 connected to the small-scale cell 300 is located in a boundary of the small-scale cell, the connection with the small-scale cell 300 may be disconnected due to the interference from the macro cell 200. This implies that the coverage of the small-scale cell 300 is smaller than expected.

For another example, in the case that the UE 100 connected to the macro cell 200 is located in an area of the small-scale cell 300, the connection with the macro cell 200 may be disconnected due to the interference from the small-scale cell 300. This implies that a shadow area exists in the macro cell 200.

In the most fundamental method for solving such an interference problem, different frequencies are used between cells. However, since a frequency is a rare and expensive resource, a method of solving the problem by using a frequency division is not much welcomed by a vendor.

Accordingly, in 3GPP, such an inter-cell interference problem is to be solved through a time division manner.

According to this, recently, as one of interference corporation methods, vigorous researches for enhanced inter-cell interference coordination (eICIC) have been progressed.

The time division method introduced in LTE release-10 is called an enhanced ICIC (inter-cell interference coordination) in a sense that it is more enhanced than the conventional frequency division method. In this method, an interfering cell is called an aggressor cell or a primary cell, and an interfered cell is defined as a victim cell or a secondary cell. The aggressor cell or the primary cell stops a data transmission in a specific subframe, and a UE is allowed to maintain a connection with the victim cell or the secondary cell in the corresponding subframe. That is, in this method, if heterogeneous cells co-exist, one cell temporarily stops signal transmission as to a UE which experiences a significantly high interference in a certain area, so that an interference signal is almost not sent.

Meanwhile, a specific subframe in which the data transmission stops is called an ABS (almost blank subframe). No data is transmitted other than essential control information in a subframe corresponding to the ABS. For example, the essential control information is a CRS (cell-specific reference signal). In the current 3GPP LTE/LTE-A standard, the CRS signal exists only in $0^{th}$, $4^{th}$, $7^{th}$ and $11^{th}$ OFDM symbols in each subframe on a time axis. Accordingly, in the subframe to which the ABS is applied, only the CRS signal is transmitted on the $0^{th}$, $4^{th}$, $7^{th}$ and $11^{th}$ OFDM symbols.

Figure 12A:
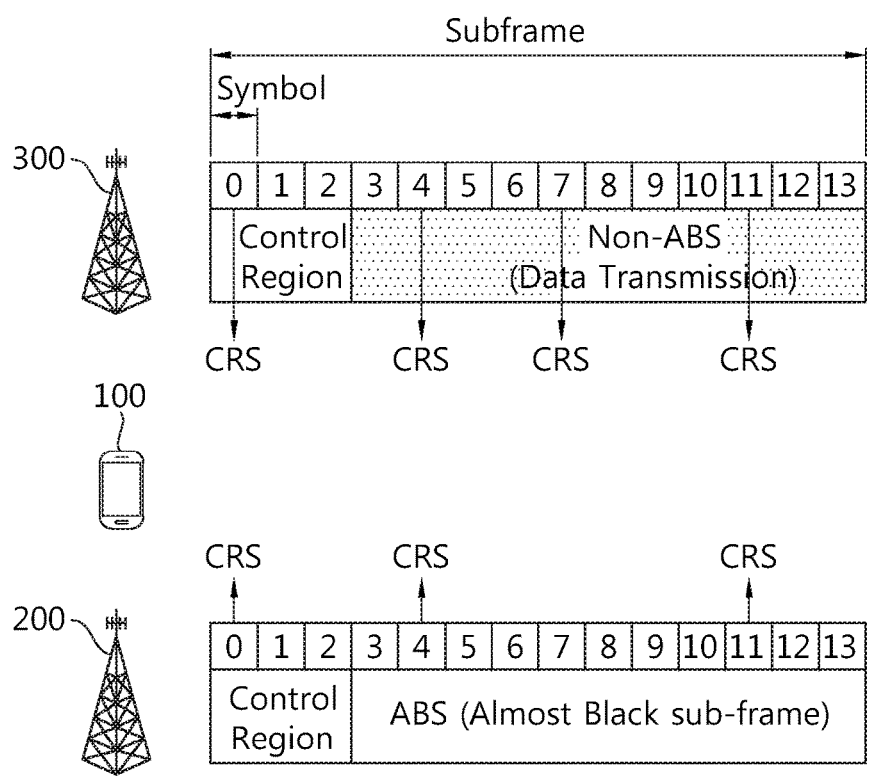
FIG. 12a is a view illustrating an enhanced Inter-Cell Interference Coordination (eICIC) for solving interference between BSs.

FIG. 12a is a view illustrating an enhanced Inter-Cell Interference Coordination (eICIC) for solving interference between BSs.

Referring to FIG. 12, a first eNodeB 200a performs a data transmission in the data region of the subframe which is shown, and the CRS is transmitted in $0^{th}$, $4^{th}$, $7^{th}$ and $11^{th}$ OFDM symbols.

In this case, a second eNodeB 200b operates the subframe which is shown as an ABS.

That is, when the eICIC is applied, in the second eNodeB 200b, the corresponding subframe is operated according to the ABS, and no data may be transmitted in a data region.

However, in the subframe operated according to the ABS, only the CRS may be transmitted in $0^{th}$, $4^{th}$, $7^{th}$ and $11^{th}$ OFDM symbols.

Figure 12B:
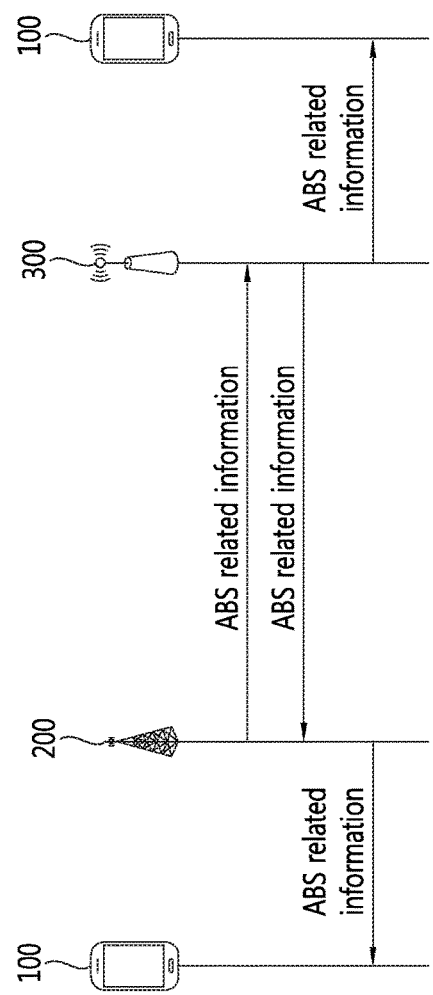
FIG. 12b illustrates an example of exchanging ABS subframe-related information.

FIG. 12b illustrates an example of exchanging ABS subframe-related information.

As can be seen from FIG. 12b, ABS-related information may be exchanged between the first eNodeB 200a and the second eNodeB 200b through an X2 interface.

Further, the first eNodeB 200a and the second eNodeB 200b may deliver the ABS-related information to their serving UEs 100a and 100b.

The first eNodeB 200a and the second eNodeB 200b may configure measurement subsets for their serving UEs 100a and 100b based on one or more of their ABS-related information and opposite party's ABS-related information and may transfer them.

Since the cells 200a and 200b do not perform downlink signal transmission on the downlink sub-frames configured as ABSs or transmit downlink signals with reduced power, the interference with the coverage of another cell may be reduced as compared with a downlink sub-frame that is not configured as an ABS. As such, the magnitude of interference may be varied depending on whether the sub-frame has been configured as an ABS, and thus, the UE 100 performs measurement only on a particular pre-designated sub-frame.

To that end, each cell 200a and 200b may instruct its serving UE 100a and 100b to perform measurement only on a particular sub-frame based on one or more of its ABS pattern information and opposite party's ABS pattern information. This is called restricted measurement. The instruction may be delivered through a higher layer signal. The higher layer signal may be an RRC signal. The signal may be a CQI-ReportConfig element.

The ABS-related information includes ABS information and an ABA state.

First, the ABS information may include one or more of the information elements shown in the following table, for example. The ABS pattern information is information indicating a sub-frame to be used as an ABS in a bitmap. The ABS pattern information may include a bitmap of 40 bits in FDD and a bitmap of up to 70 bits in TDD. For FDD as an example, 40 bits indicate 40 sub-frames. In the case that the bit value is 1, it indicates an ABS, and in the case that the bit value is 0, it indicates a non-ABS normal sub-frame. The measurement subset is a subset of the ABS pattern information. The measurement subset includes a bitmap of 40 bits for FDD and a bitmap for up to 70 bits for TDD. The measurement subset is for configuring measurement restricted to the corresponding UE.

TABLE 1

| Information element | Description |
| --- | --- |
| ABS Pattern Info | The value, 1, at each position of the bitmap indicates information an ABS, and the value, 0, indicates a non-ABS. The first position in the ABS pattern corresponds to subframe 0 in the radio frame that is SFN=. The ABS pattern is consecutively shown up in all radio frames. The maximum number of the subframes is 40. |
| Measurement Subset | Indicates a subset of ABS pattern information and is subset used to configure a particular measurement for the UE. |
| ABS deactivation | Indicates that interference adjustment by ABS is not activated. |

Next, the ABS state is used to enable determination as to whether a corresponding cell should change ABS patterns.

Available ABA pattern information is a subset of ABS pattern information and is constituted of a bitmap. The available ABS pattern information indicates whether a designated sub-frame has been properly used for the purpose of mitigating interference. The downlink ABS state is a ratio of the number of downlink resource blocks (RBs) scheduled in the sub-frame designated in the available ABS pattern information to then number of resource blocks (RBs) allocated for the UE that should be protected through the ABS, and the downlink ABS state indicates information as to how efficient the ABS has been utilized to fit its original purpose in the victim cell.

TABLE 2

| Information element | Description |
| --- | --- |
| Downlink ABS state | A percentage of ABS resources used. The numerator of the percentage includes resource blocks in the ABS indicated in the available ABS pattern information, and the denominator is the total number of resource blocks in the ABS indicated in the available ABS pattern information. |
| Availability of ABS pattern information | Each position in the bitmap indicates a sub-frame, pattern information and the value "1" indicates an ABS designated as protected from inter-cell interference. The value "0" is used for all other sub-frames. The pattern represented by the bitmap includes a subset of corresponding ABS pattern information or is constituted identically. |

The measurement subset constituted as a subset of the ABS pattern information is a subframe used as an ABS. The other subframes included in the ABS pattern may determine whether the corresponding cell may be freely utilized as ABS depending on traffic load.

As described above, in addition to the solution of the inter-cell interference problem through the eICIC technique, there may be a method of adding an interference cancellation function to the UE 100.

<Disclosure of the Present Specification>

Hereinafter, by reference to the accompanying drawings, an interference cancellation method, a data reception method through the interference cancellation and an interference cancellation function of a UE according to a disclosure of the present specification will be described in detail.

Recently, in the LTE/LTE-A standard, for the maximizing an efficiency of a radio channel, introduction of various techniques has been vigorously discussed. Among these, as a method for obtaining a performance benefit owing to the improvement of a User Equipment (UE) reception unit, the standardization of Network Assisted Interference Cancellation and Suppression (NAICS) receiver has been vigorously discussed.

A disclosure of the present specification proposes an NAICS receiver (Interference Cancellation-IC) that may increase the transmission quality of user data transmitted in a serving cell by regenerating an incoming interference signal from a neighboring cell in a symbol level and deducting the interference signal from a reception signal.

Particularly, a disclosure of the present specification relates to a UE that supports the Network Assisted Interference Cancellation and Suppression (NAICS) based on a DeModulation Reference Signal (DMRS) operated in the LTE-A system, and proposes an operation scheme throughout the NAICS reception algorithms including a detection technique of a DMRS related transmission parameter.

The NAICS receiver is a kind of data ICs for a PDSCH channel of LTE/LTE-A.

Usually, the data IC technique is a technique that a receiver estimates and regenerates an incoming interference signal, and demodulates a reception signal by considering the regenerated interference signal through an appropriate signal processing technique.

In the current LTE-standard, total ten Transmission Modes (TMs) are existed and they are transmitted by using different transmission techniques for each TM.

The receiver of the data IC technique such as an NAICS receiver is required to know the TM of an interference signal and the related transmission parameter in advance in order to regenerate the incoming interference signal.

The TM used in LTE-A standard and the transmission technique according to it may be classified as follows.

- CRS-based transmission technique
  Single Antenna: TM1
  SFBC (Space Frequency Block Code): TM2, TM3 rank 1
  Large Delay CDD (Cyclic Delay Diversity): TM3 rank 2
  Spatial Layer Multiplexing: TM4, TM6
- DMRS-based transmission technique
  Spatial Layer Multiplexing: TM8, TM9, TM10

The main contents of the technique according to a disclosure of the present invention are an operation for removing a data interference signal from TM8/TM9/TM10 that uses the DMRS-based transmission technique among various TM modes.

In order to remove the data interference signal, the information of the interference signal is needed to be detected or acquired from a network in advance.

A disclosure of the present specification proposes the entire operation processes for detecting all of the interference signal information and removing the data interference signal which is progressed later.

A data interference removing receiver may obtain performance benefit by improving the Signal-to-Interference-plus-Noise Ratio (SINR) of a serving signal by removing an interference data signal.

The information required for removing the interference signal is arranged as Table 3 below in the current 3GPP Rel-12 standard.

TABLE 3

| Parameter | Frequency | Time |
| --- | --- | --- |
| RI | PRB | Subframe |
| PMI | PRB | Subframe |
| TM | PRB | subframe |
| Modulation Order | PRB | subframe |
| Data to RS EPRE, PA | PRB | subframe |
| DMRS APs | PRB | Subframe |
| nSCID | PRB | Subframe |
| CFI | Wideband | Subframe |
| PDSCH allocation | PRB | Subframe |
| PDSCH bandwidth for DM-RS | | subframe |
| CRS AP | Wideband | Semistatically configured |
| Cell ID | Wideband | Semistatically configured |
| Data to RS EPRE, PB | Wideband | Semistatically configured |
| System bandwidth | Wideband | Semistatically configured |
| MBSFN configuration | Wideband | Semistatically configured |
| MCS | PRB | Subframe |
| RNTI | PRB | Subframe |
| CSI-RS presence and their pattern | Wideband | Semistatically configured |
| Virtual cell ID | PRB | Subframe |

Basically, the parameter required for the NAICS receiver often corresponds to a transmission parameter of a neighboring cell. Considering a typical Non-ideal Backhaul, the transmission parameter which is changed in every subframe corresponds to a dynamic parameter among various transmission parameters, and explicitly notified to the NAICS receiver. In the case of such a dynamic parameter, a NAICS UE should perform a Blind Detection of the transmission parameter autonomously, and the items that correspond to those are as follows.

an RI (Rank Indicator), PMI (Precoding Matrix Indicators), a TM, a Modulation order, $P_A$, DMRS APs (DMRS antenna ports), an nSCID (scrambling identifier), a CFI (Control Format Indicator), PDSCH allocation, PDSCH bandwidth for DM-RS, a virtual cell ID The parameter commonly applied to all UEs in a cell, not to a transmission parameter-specific UE, is regarded as a Semi-static parameter. Such a semi-static parameter is available to perform signaling with each other even in the case that a connection with a neighboring BS is based on the Non-ideal Backhaul. Accordingly, the corresponding serving cell receives such a semi-static parameter from a neighboring BS and transmits it to an NAICS UE in a cell through an RRC signaling.

The following items are existed in such a semi-static parameter.

CRS AP (antenna port), Cell ID, $P_B$, system bandwidth, MBSFN configuration, CSI-RS presence and pattern Among these parameters, the dynamic parameter in which a blind detection is required among the DMRS-based transmission parameters considered in a disclosure of the present specification is as follows.

Modulation order, DMRS APs (antenna ports), an nSCID, PDSCH bandwidth for DM-RS, a virtual cell ID That is, a UE according to a disclosure of the present specification may try or perform a blind detection for the DMRS-based transmission parameters including the information for at least one of DMRS presence, a cell ID for the interference cell, a virtual cell ID, an antenna port, a scrambling identifier (nSCID) and Signal to Noise Ratio (SNR) for the interference signal.

Figure 13:
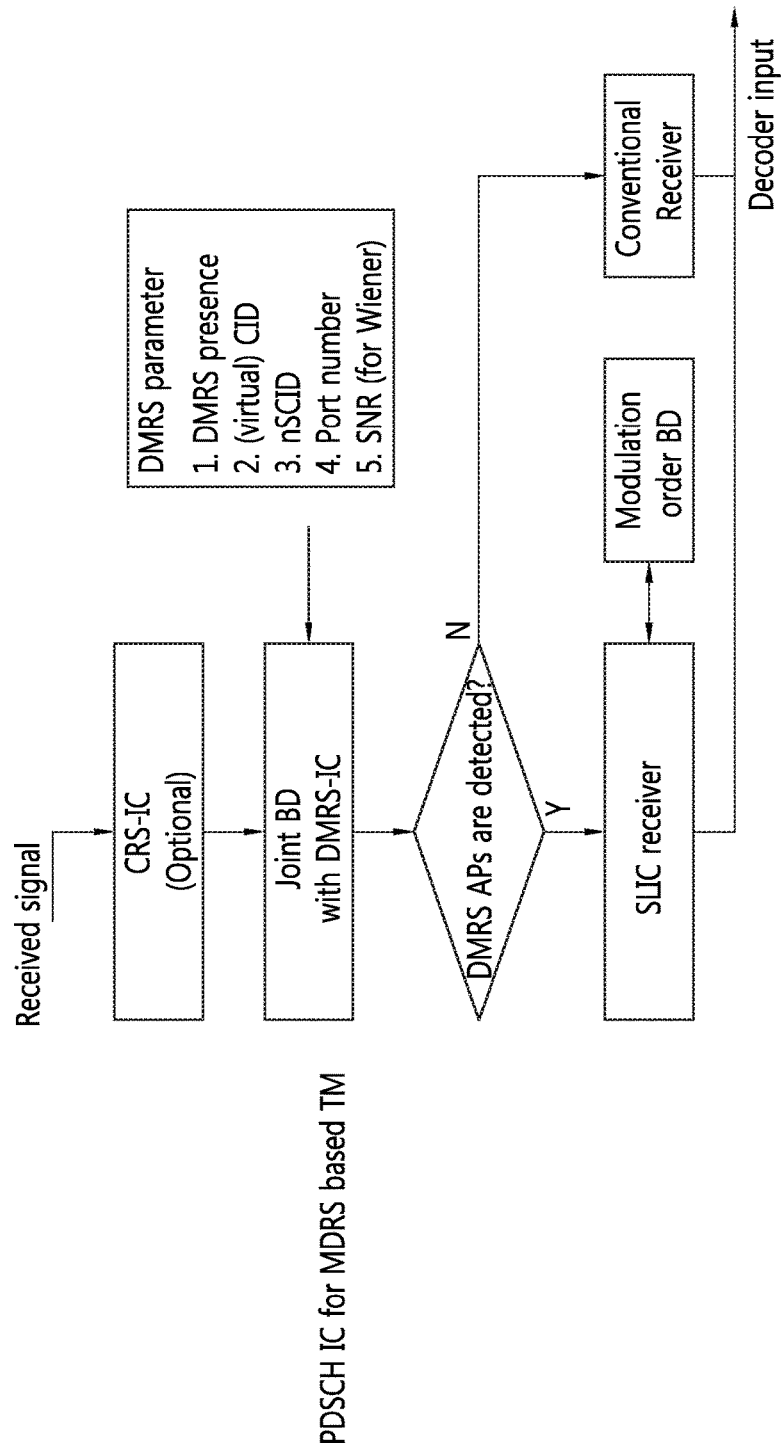
FIG. 13 illustrates an example of an operation of an NAICS UE receiver according to a disclosure of the present specification.

FIG. 13 illustrates an example of an operation of an NAICS UE receiver according to a disclosure of the present specification.

Referring to FIG. 13, since it is assumed that a NAICS UE receiver is operated under an interference signal of a strong neighboring cell, it may be that the interference due to a CRS of a neighboring cell also removes the interference in the CRS position through a CRS-IC receiver. A construction of such a CRS-IC receiver may be easily identified in the existing implementation example, and an optional function is denoted in FIG. 13.

In the operation shown in FIG. 13, since an operation of a CRS-IC is presumed, among the incoming reception signals in advance, the interference due to the CRS of a neighboring cell is removed by the CRS-IC.

That is, according to a disclosure of the present invention, before detecting the DMRS-based transmission parameter (e.g., the operation parameter), a UE may perform a Cell specific Reference Signal Interference Cancellation (CRS-IC) first for removing interference for a Cell specific Reference Signal (CRS).

Assuming that m interference cells are existed, the subsequent reception signal in $n^{th}$ order in frequency axis and $k^{th}$ order in time axis may be expressed as follows.

$$y_{n,k} = H^0_{n,k} x^0_{n,k} + \sum_{i=1 \& (n,k) \notin CRS^i}^{m} H^i_{n,k} x^i_{n,k} + z_{n,k} \qquad \text{[Equation 12]}$$

In the technique of a disclosure of the present invention, the number of interference cells is not limited. However, for the convenience of description, the number of interference cells is assumed to be 2. In this case, the Equation above is modeled as follows.

[Equation 13]

$$\begin{aligned}
y_{n,k} &= H^0_{n,k} x^0_{n,k} + H^2_{n,k} x^2_{n,k} + z_{n,k} & \leftarrow \text{Case } 1([n,k] \in CRS^1) \\
&= H^0_{n,k} x^0_{n,k} + H^1_{n,k} x^1_{n,k} + z_{n,k} & \leftarrow \text{Case } 2([n,k] \in CRS^2) \\
&= H^0_{n,k} x^0_{n,k} + z_{n,k} & \leftarrow \text{Case } 3([n,k] \in CRS^1 \ \& \\
& & CRS^2) \\
&= H^0_{n,k} x^0_{n,k} + H^1_{n,k} x^1_{n,k} + H^2_{n,k} x^2_{n,k} + z_{n,k} & \leftarrow \text{Case 4 (otherwise)}
\end{aligned}$$

In the case of limiting the Equation to the DMRS-based transmission technique, $H_{n,k}{}^i$ means an effective channel that includes a Precoding applied to a BS in advance to the characteristics of a substantive channel. In the case of the DMRS-based channel estimation, since a UE directly estimates the effective channel to which a Precoding is applied without recognizing the Procoding applied in advance, the NAICS UE does not require the Blind Decoding procedure for the Precoding.

In Equation 13, Cases 1/2/3 are determined according to whether there is CRS collision between a serving cell and a neighboring cell, and a particular determination is available by $v_{shift}$ value that is obtained by a cell ID. The $v_{shift}$ value of the $i^{th}$ cell is as follows.

$$v_{shift}{}^i = \text{mod}(cellId^i, 3) \qquad \text{[Equation 14]}$$

Figure 14A:
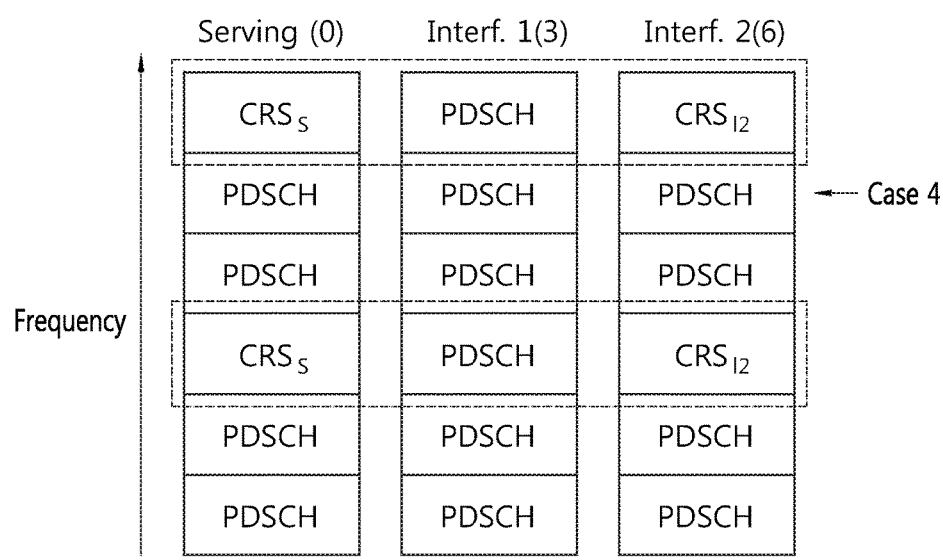
FIGS. 14a to 14c are exemplary views illustrating the cases to which a disclosure of the present specification may be applied in the case that there are two interference cells.
Figure 14B:
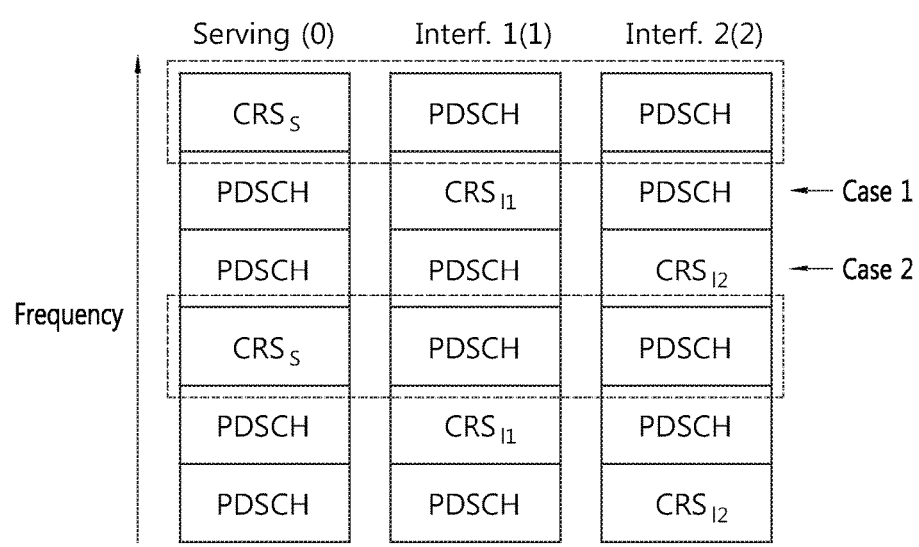
Figure 14C:
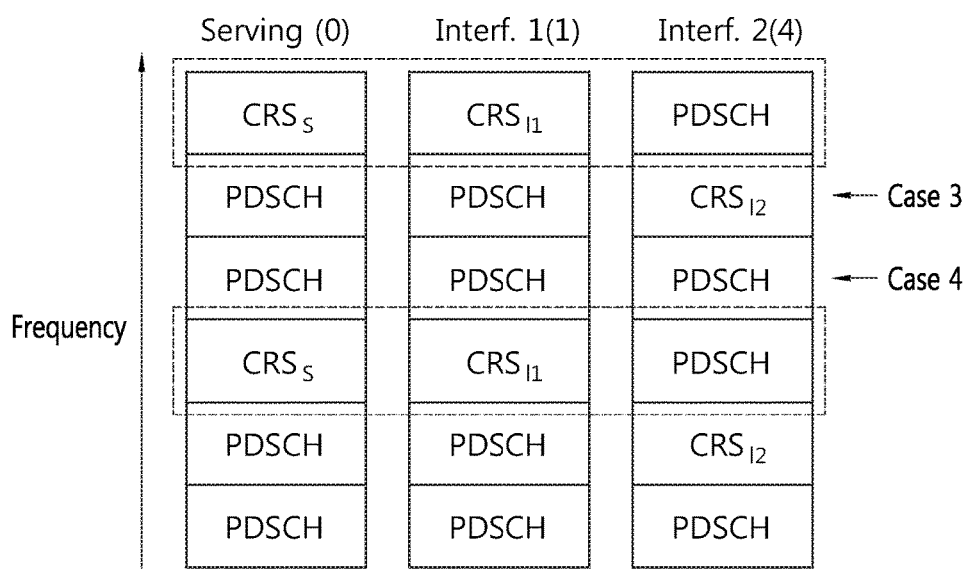

FIGS. 14a to 14c are exemplary views illustrating the cases to which a disclosure of the present specification may be applied in the case that there are two interference cells.

Referring to FIGS. 14a to 14c, basically, in the case of OFDM symbol in which a CRS is not existed (k $\notin$ {0, 4, 7, 11}), only Case 4 is existed. On the other hand, in the case of OFDM symbol in which a CRS is existed (k $\notin$ {0, 4, 7, 11}), Cases 1/2/3/4 are existed depending on the difference of $v_{shift}$ value between a serving cell and an interference cell.

Among these cases, a reception signal to which the NAICS technique according to a disclosure of the present specification is applied corresponds to Case 1/Case 2/Case 4. And the signal that corresponds to Case 3 is demodulated according to a typical reception technique since interference of a neighboring cell is removed in advance through the existing CRS-IC.

Among these, the signal according to Case 1/Case 2 removes the incoming interference signal from an interference cell, respectively, and the signal according to Case 4 removes the incoming interference signal from two interference cells.

According to the DMRS-based transmission technique, in order to perform channel estimation for the incoming interference signal as such, the DMRS-based channel estimation is performed.

This procedure is performed by a DMRS-IC part in FIG. 13. The DMRS-IC performs a blind detection for an interference cell additionally together with the serving cell that knows all parameters for the corresponding transmission technique in advance.

Figure 15:
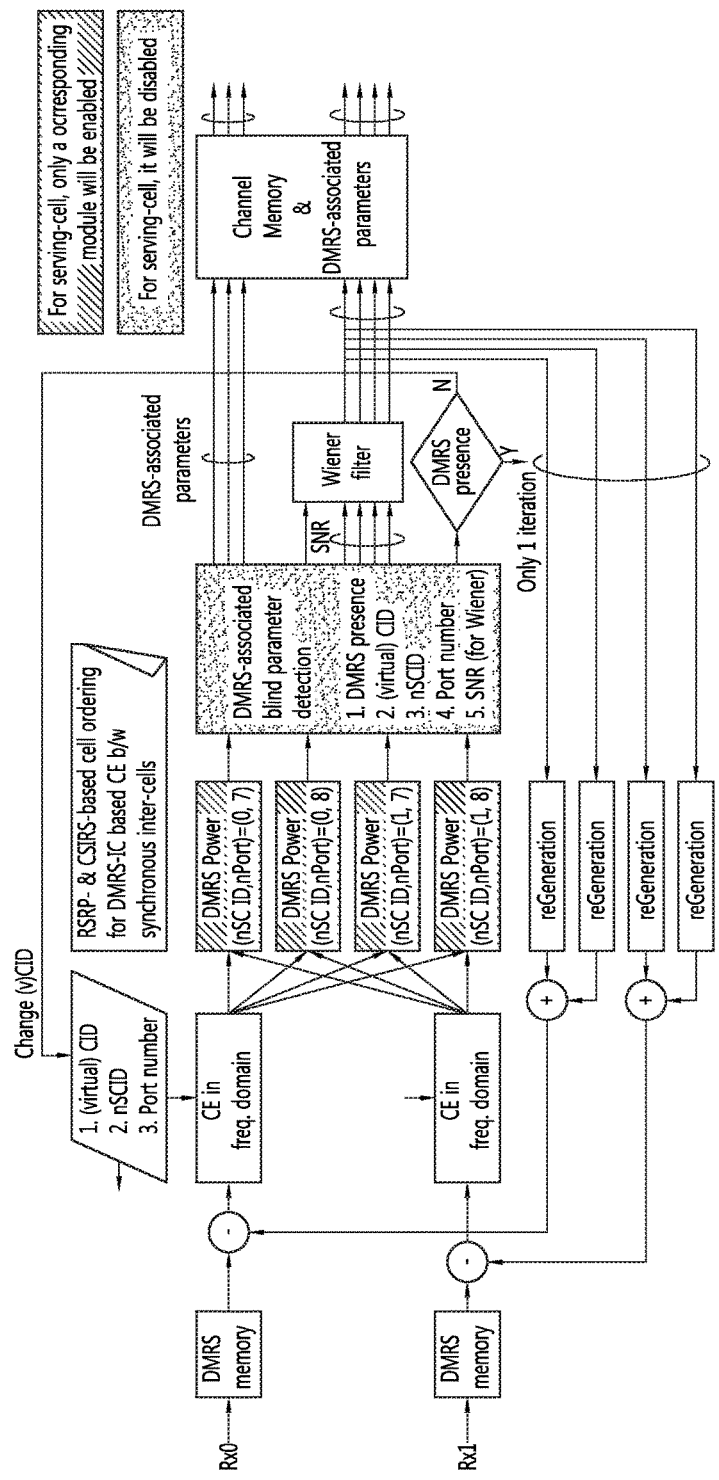
FIG. 15 is a block diagram illustrating an example of a DMRS-CI according to a disclosure of the present specification.

FIG. 15 is a block diagram illustrating an example of a DMRS-IC according to a disclosure of the present specification.

FIG. 15 shows an implementation example for the case that supports a UE including two reception (Rx) antennas and up to two layers, for the convenience of description. A disclosure of the present specification is not limited to an actual number of Rx antennas and Tx layers.

Basic DMRS-IC is constructed as a form of Successive Linear Interference Cancellation (SLIC).

First, a reception unit of the DMRS-IC performs channel estimation sequentially from a cell of which reception level is the greatest in a predetermined order according to a cell reception power estimation based on a CRS.

This procedure is independently performed for each Resource Block (RB). Firstly, a Least Square estimation value for a channel H is made by multiplying a conjugate of DMRS sequence that corresponds to a cell that is going to be estimated to each Rx antenna.

The estimation for all parameters in relation to a DMRS is performed through a blind detection based on the Energy Detection from estimated $H_{LS}$.

The DMRS sequence transmitted is made in a Pseudo-random sequence generator which is defined in the current LTE standard, and an initial value of the Pseudo-random sequence generator is determined as follows.

$$c_{init}=(\lfloor n_s/2 \rfloor+1)\cdot(2n_{ID}^{(nSCID)}+1)\cdot 2^{16}+n_{SCID} \quad \text{[Equation 15]}$$

Herein, $n_{ID}^{(nSCID)}$ uses a cell ID in all DMRS-based transmission technique except the case of configuring a separate Virtual cell ID in TM10. In the case of a separate Virtual cell ID in TM10, the corresponding Virtual cell ID is used.

The value of 0 or 1 is existed for $n_{SCID}$ and in the corresponding RE, 0 and 1 are not simultaneously existed.

Particularly, in the DMRS-based transmission, each cell is transmitted according to each scheduling technique for Tx antenna ports p=7, p=8 and p=7, 8.

In this case, the NAICS reception UE should perform the estimation for the DMRS-based interference signal incoming from a neighboring cell. In this case, there are up to four set of DMRS sequences including two cases for each antenna port and two cases for each $n_{SCID}$ to be detected.

Among these, when a DMRS sequence is detected in a $n_{SCID}$ a detection of the DMRS sequence that corresponds to the remaining $n_{SCID}$ is disregarded since it is the case that cannot exist.

Through the above procedure, $H_{LS(n,k,p,n_{SCID})}^i$ is calculated in a specific port and a specific $n_{SCID}$, and a blind detection is performed by comparing the reception power for the corresponding channel inferred from the calculated value with a predetermined threshold value.

In this case, since the reception powers that correspond to channel value $H_{LS(n,k,p,n_{SCID})}^i$ in a given RB have a correlation throughout several REs, the reception power may be easily obtained through a coherent estimation as follows.

$$P_{DMRS(n,k,i,p,n_{SCID})} = \left| \sum_{r \in S_{DMRS(n,k)}} H_{LS(r,p,n_{SCID})}^i \right|^2 \quad \text{[Equation 16]}$$

Although the above Equation should be divided as much as the number of $s_{DMRS(n,k)}$ that corresponds to a DMRS RE, the division may be omitted through a scaling for a threshold value in advance in order to decrease a complexity of calculation.

In the case of $P_{DMRS(n,k,p,n_{SCID})} \geq Th$, it may be assumed that there is a DMRS and a PDSCH of the corresponding port/nSCID, and in this case, a channel value for the entire channels may be estimated through the Wiener Filter for removing noise and interpolation to $H_{LS(n,k,p,n_{SCID})}^i$.

$$H_{(n,k,p,n_{SCID})}^i = R_{(\sigma^2,\tau,F_D)} \cdot H_{LS(n,k,p,n_{SCID})}^i \quad \text{[Equation 17]}$$

Herein, $R_{(\sigma^2,\tau,F_D)}$ means a Wiener Filter correlation coefficient in the estimated Noise Variance ($\sigma^2$), Channel Group Delay ($\tau$) and Doppler ($F_D$).

Among the estimation values required for the Wiener Filter correlation coefficient, the Channel Group Delay ($\tau$) and Doppler ($F_D$) may be estimated in the related CRS or CSI-RS channel estimation procedure.

Meanwhile, the Noise Variance ($\sigma^2$) is a value that corresponds to the SINR of a signal that is going to be estimated currently, and required to be actually estimated in a DMRS position. For this, a DMRS-IC makes the SINR of signal that is going to be estimated be estimated as follows.

$$SINR_{DMRS(n,k,i,p,n_{SCID})} = \frac{P_{DMRS(n,k,i,p,n_{SCID})}}{P_{X(n,k,i,p,n_{SCID})} - P_{DMRS(n,k,i,p,n_{SCID})}} \quad \text{[Equation 18]}$$

Herein, $P_{X(n,k,p,n_{SCID})}$ means a total power of a signal in the current SLIC Stage, and is estimated as follows.

$$P_{X(n,k,i,p,n_{SCID})} = \left| \sum_{r \in S_{DMRS(n,k)}} X_r \right|^2 \quad \text{[Equation 19]}$$

Finally, when a channel ($H_{(n,k,p,n_{SCID})}$) in antenna port p of the corresponding interference cell is completed, the SINR of a signal is improved by deducting the DMRS interference of a neighboring cell, which is regenerated in the reception data $X_r$ in the DMRS RS on the current SLIC Stage, as follows.

$$X_r^{l+1} = X_r^l - H_{(r,p,n_{SCID})} \cdot DMRS_r; \; r \notin S_{DMRS(n,k)} \quad \text{[Equation 20]}$$

In addition, for the equalization in the current SLIC Stage, a Noise Covariance Matrix may be obtained as follows.

$$R_{RB}^l = E\{X_r^{l+1} \cdot (X_r^{l+1})^H\} \quad \text{[Equation 21]}$$

Through the DMRS-IC as described above procedure, a blind detection becomes available for the related parameters except the DMRS-based channel estimation and the modulation order on TM8/9/10 transmission modes.

Later, a UE according to a disclosure of the present specification receives wanted data finally through the SLIC receiver which is implemented for a PDSCH.

In summary again, a UE according to a disclosure of the present specification may estimate each interference channel for each antenna port and scrambling identifier for the interference cell, compare the reception power for each interference channel which is estimated with a predetermined threshold value, and detect the antenna port and scrambling identifier that corresponds to the case that the reception power is greater than the threshold value as the antenna port and scrambling identifier for the interference cell.

In addition, the UE may detect a modulation order based on the interference channel which is estimated.

Accordingly, the interference signal may be generated based on the estimated interference channel and the modulation order.

Furthermore, the interference cell is plural, and each of a plurality of interference signals is sequentially generated from the interference signal of which signal strength is the greatest. And, removal of the interference signal from the transmission signal may be performed by sequentially removing the interference signal from the interference signal of which signal strength is the greatest.

Figure 16:
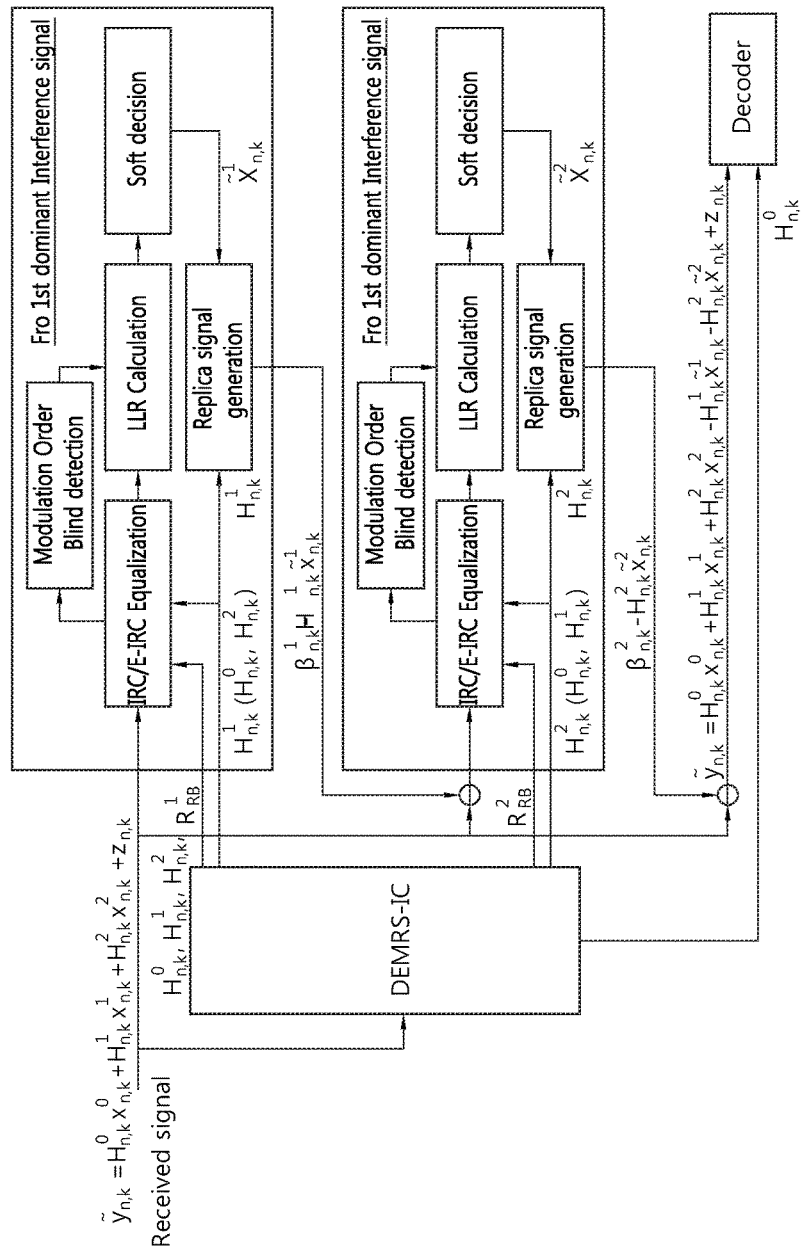
FIG. 16 illustrates an example of a configuration of SLIC reception according to a disclosure of the present specification.

FIG. 16 illustrates an example of a configuration of SLIC reception according to a disclosure of the present specification.

The SLIC reception unit for a PDSCH shown in FIG. 16 is an implementation example for the case that up to two layers are supported for the convenience of description, and the technique disclosed in the present specification is not limited for an actual Tx layer.

A detection of the modulation order that is unable to be estimated through the DMRS-IC is performed for every SLIC stage of a PDSCH SLIC reception unit, and a particular position is performed for an output signal of Single Layer IRC Equalizer.

The modulation order detection is operated based on Maximum Likelihood (ML), basically, and the basic determination criteria are as follows.

$$MO^l = \underset{Q_m \in QPSK, 16QAM, \dots}{\text{argmin}} \sum_{d \in SPDSCHRE} \|X_d^l - Q_m(X_d^l)\|^2 + C_{Q_m} \quad \text{[Equation 22]}$$

The above equation is evolved for QPSK and 16 QAM, for convenience sake, the additional modulation order detection may be implemented only by increasing complexity properly.

$X_d^l$ and $Q_m$ mean Hard Decision Slicers, and mean a block that outputs a constellation closest to the QPSK and 16 QAM conditions, respectively. d means a set of PDSCH RE (k, n) in the corresponding RB.

$C_{Q_m}$ means a compensation coefficient according to the corresponding modulation scheme, and uses a constant value for each SNR in a form of table. The SNR used herein also uses the SINR value for each SLIC stage which is estimated in the DMRS above.

According to the technique disclosed in the present specification, through the procedure described above, a reception performance may be obtained through an operation of NAICS receiver in the DMRS-based transmission mode.

Figure 17A:
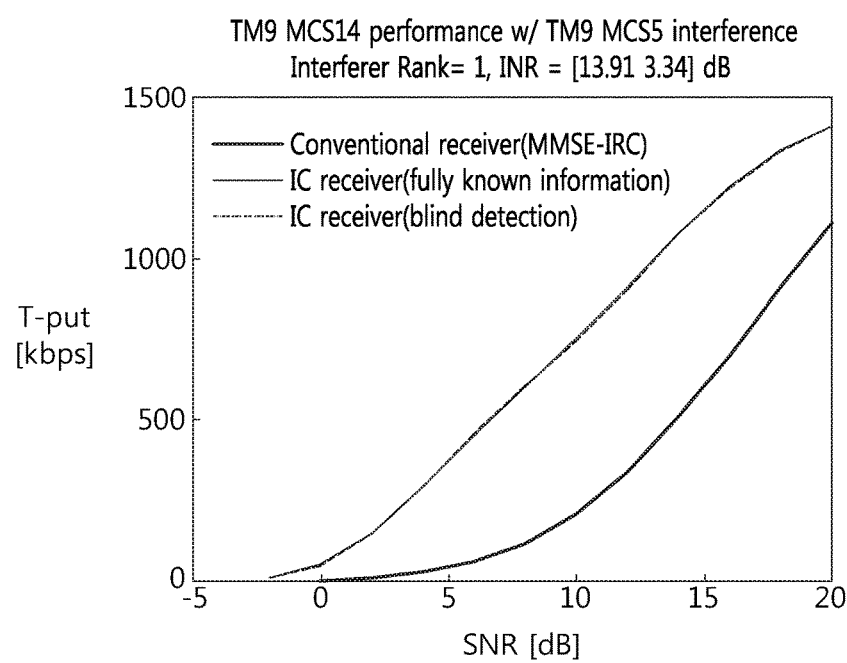
FIGS. 17a and 17b illustrate a result of performance improvement according to a disclosure of the present specification.
Figure 17B:
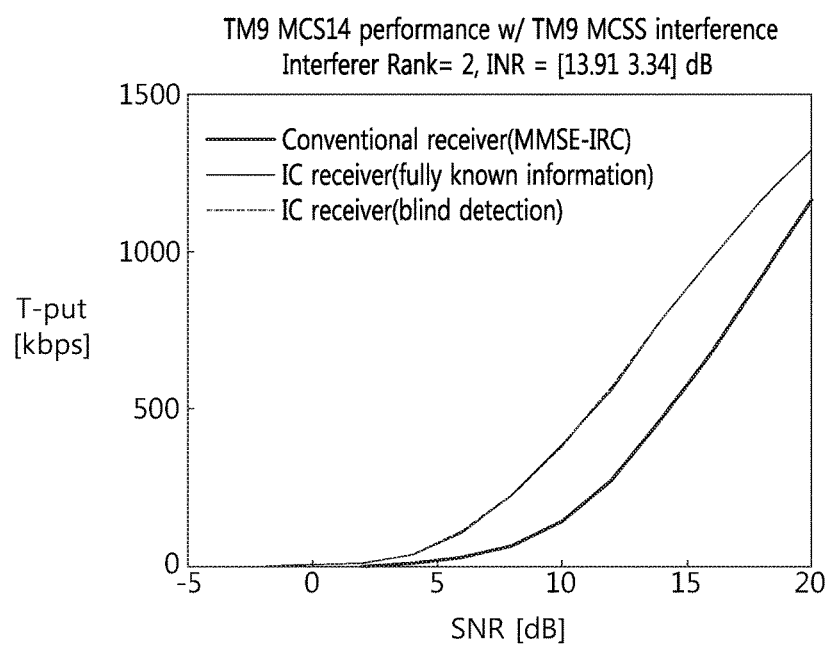

FIGS. 17a and 17b illustrate a result of performance improvement according to a disclosure of the present specification.

FIGS. 17a and 17b are examples of the performance for the cases in which interference is Rank 1 and Rand 2 for an operation procedure of the data interference removal receiver (the blind detection means to perform a blind detection for interference signal information.).

The embodiments described so far may be implemented through various means. For example, the embodiments of the present invention may be implemented by hardware, firmware, software or the combination thereof. Particularly, this will be described by reference to FIG. 18.

Figure 18:
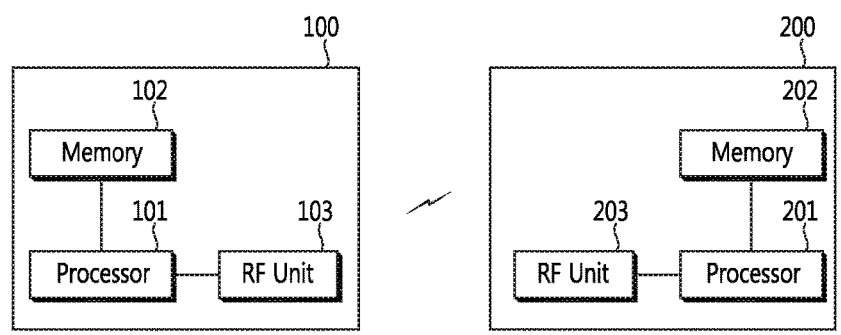
FIG. 18 is a block diagram illustrating a wireless communication system in which the embodiment of the present invention is implemented.

FIG. 18 is a block diagram illustrating a wireless communication system in which the embodiment of the present invention is implemented.

The BS includes a processor 201, a memory 202, and an RF (radio frequency) unit 203. The memory 202 is connected with the processor 201 and stores various pieces of information for driving the processor 201. The RF unit 203 is connected with the processor 201 and transmits and/or receives radio signals. The processor 201 implements functions, processes, and/or methods as suggested herein. In the above-described embodiments, the operation of the base station may be implemented by the processor 201.

The wireless device 100 includes a processor 101, a memory 102, and an RF unit 103. The memory 102 is connected with the processor 101 and stores various pieces of information for driving the processor 101. The RF unit 103 is connected with the processor 101 and transmits and/or receives radio signals. The processor 101 implements functions, processes, and/or methods as suggested herein. In the above-described embodiments, the operation of the wireless device may be implemented by the processor 101.

The processor may include an application-specific integrated circuit (ASIC), a separate chipset, a logic circuit, and/or a data processing unit. The memory may include a read-only memory (ROM), a random access memory (RAM), a flash memory, a memory card, storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

A UE according to a disclosure of the present specification is a UE for receiving data in a wireless communication system, and may include a radio frequency (RF) unit configured to receive a transmission signal transmitted by a transmission scheme based on a DeModulation Reference Signal (DMRS) and a processor configured to perform: detecting a DMRS-based transmission parameter for an interference cell that causes interference on the transmission signal from the transmission signal, estimating an interference channel for the interference cell based on the detected DMRS-based transmission parameter, generating an interference signal for the interference cell based on the estimated interference channel, and reconstructing data transmitted by a serving cell by removing the generated interference signal from the transmission signal.

The DMRS-based transmission parameter may include at least one of DMRS presence, a cell ID for the interference cell, a virtual cell ID, an antenna port, a scrambling identifier (nSCID) and Signal to Noise Ratio (SNR) for the interference signal.

In addition, the processor is configured to perform: estimating each interference channel for each antenna port and scrambling identifier for the interference cell, comparing a reception power for each interference channel which is estimated with a predetermined threshold value, and detecting the antenna port and scrambling identifier that corresponds to the case that the reception power is greater than the threshold value as the antenna port and scrambling identifier for the interference cell.

In addition, the processor may detect a modulation order based on the interference channel which is estimated, where the interference signal may be generated based on the estimated interference channel and the modulation order.

In addition, the interference cell may be plural, each of a plurality of interference signals may be sequentially generated from the interference signal of which signal strength is the greatest, and a removal of the interference signal from the transmission signal may be performed by sequentially removing the interference signal from the interference signal of which signal strength is the greatest.

In the above-described systems, the methods are described with the flowcharts having a series of steps or blocks, but the present invention is not limited to the steps or order. Some steps may be performed simultaneously or in a different order from other steps. It will be understood by one of ordinary skill that the steps in the flowcharts do not exclude each other, and other steps may be included in the flowcharts or some of the steps in the flowcharts may be deleted without affecting the scope of the invention.

The present invention may be used in a UE, a BS, or other equipment of a wireless mobile communication system.

What is claimed is:

1. A method for receiving data in a wireless communication system, the method performed by a user equipment and comprising:
    receiving a signal based on DeModulation Reference Signal (DMRS);
    detecting a DMRS-based transmission parameter for an interference cell that causes interference on the reception signal;
    estimating an interference channel for the interference cell based on the detected DMRS-based transmission parameter;
    generating an interference signal for the interference cell based on the estimated interference channel; and
    reconstructing data transmitted by a serving cell by removing the generated interference signal from the transmission signal.

2. The method of claim 1, wherein the DMRS-based transmission parameter includes
    at least one of DMRS presence, a cell ID for the interference cell, a virtual cell ID, an antenna port, a scrambling identifier (nSCID) and Signal to Noise Ratio (SNR) for the interference signal.

3. The method of claim 2, wherein detecting the DMRS-based transmission parameter includes:
    estimating each interference channel for each antenna port and scrambling identifier for the interference cell;
    comparing a reception power for each interference channel which is estimated with a predetermined threshold value; and
    detecting the antenna port and scrambling identifier that corresponds to the case that the reception power is greater than the threshold value as the antenna port and scrambling identifier for the interference cell.

4. The method of claim 1, further comprising:
    detecting a modulation order based on the interference channel which is estimated,
    wherein the interference signal is generated based on the estimated interference channel and the modulation order.

5. The method of claim 1, wherein the interference cell is plural,
    wherein each of a plurality of interference signals is sequentially generated from the interference signal of which signal strength is the greatest, and
    wherein a removal of the interference signal from the transmission signal is performed by sequentially removing the interference signal from the interference signal of which signal strength is the greatest.

6. The method of claim 1, further comprising:
    performing a Cell specific Reference Signal Interference Cancellation (CRS-IC) for removing interference for a Cell specific Reference Signal (CRS) first, before detecting the DMRS-based transmission parameter.

7. A user equipment for receiving data in a wireless communication system, comprising:
    a radio frequency (RF) unit configured to receive a transmission signal transmitted by a transmission scheme based on a DeModulation Reference Signal (DMRS); and
    a processor configured to perform:
    detecting a DMRS-based transmission parameter for an interference cell that causes interference on the transmission signal from the transmission signal,
    estimating an interference channel for the interference cell based on the detected DMRS-based transmission parameter,
    generating an interference signal for the interference cell based on the estimated interference channel, and
    reconstructing data transmitted by a serving cell by removing the generated interference signal from the transmission signal.

8. The user equipment of claim 7, wherein the DMRS-based transmission parameter includes at least one of DMRS presence, a cell ID for the interference cell, a virtual cell ID, an antenna port, a scrambling identifier (nSCID) and Signal to Noise Ratio (SNR) for the interference signal.

9. The user equipment of claim 8, wherein the processor is configured to perform:
    estimating each interference channel for each antenna port and scrambling identifier for the interference cell,
    comparing a reception power for each interference channel which is estimated with a predetermined threshold value, and
    detecting the antenna port and scrambling identifier that corresponds to the case that the reception power is greater than the threshold value as the antenna port and scrambling identifier for the interference cell.

10. The user equipment of claim 7, wherein the processor detects a modulation order based on the interference channel which is estimated,
    wherein the interference signal is generated based on the estimated interference channel and the modulation order.

11. The user equipment of claim 7, wherein the interference cell is plural,
    wherein each of a plurality of interference signals is sequentially generated from the interference signal of which signal strength is the greatest, and
    wherein a removal of the interference signal from the transmission signal is performed by sequentially removing the interference signal from the interference signal of which signal strength is the greatest.

* * * * *